July 24, 1951  D. F. WINNEK  2,562,077
COMPOSITE STEREOGRAPHY
Filed Aug. 29, 1947  11 Sheets-Sheet 1
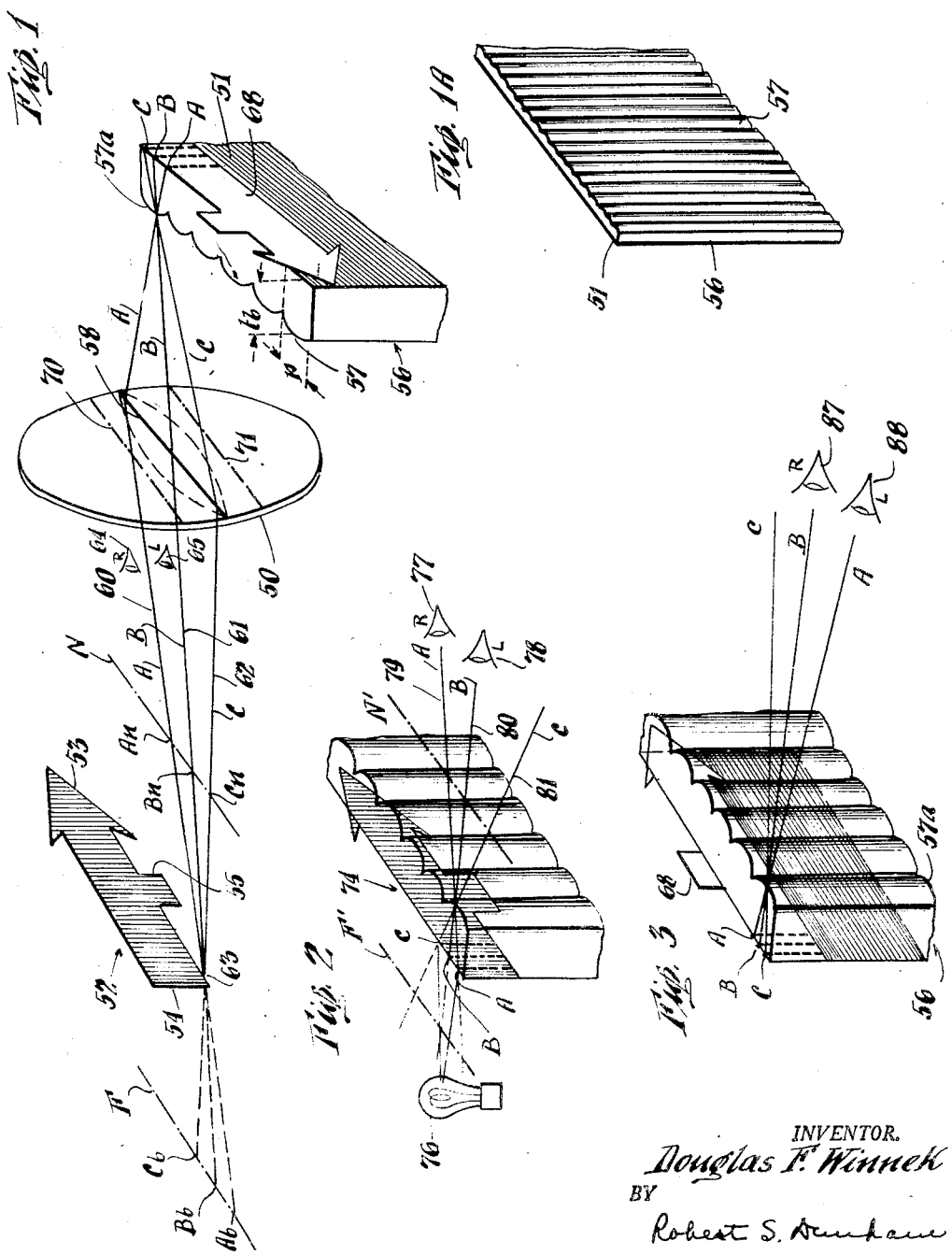
INVENTOR.
Douglas F. Winnek
BY
Robert S. Dunham
ATTORNEY

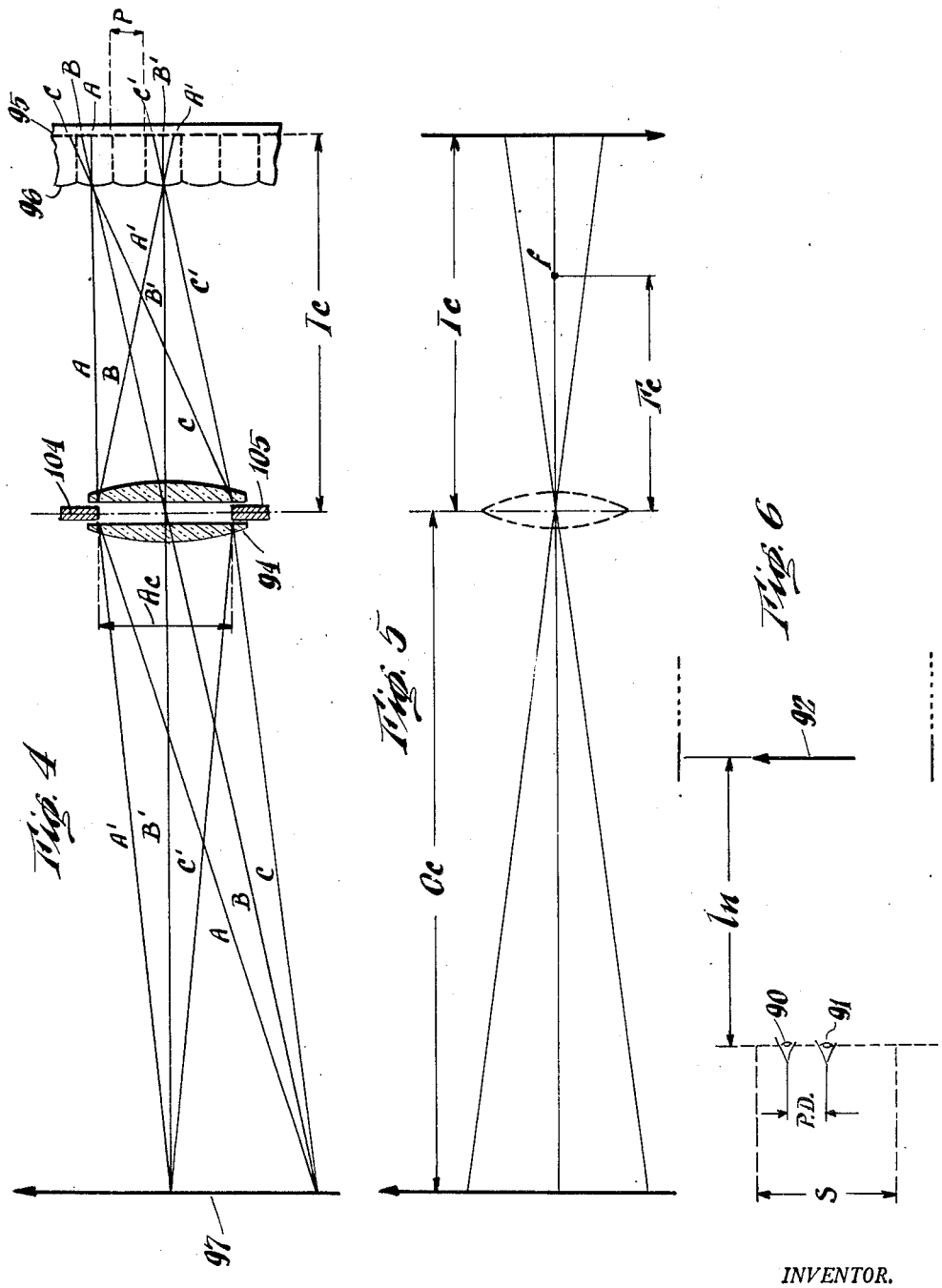

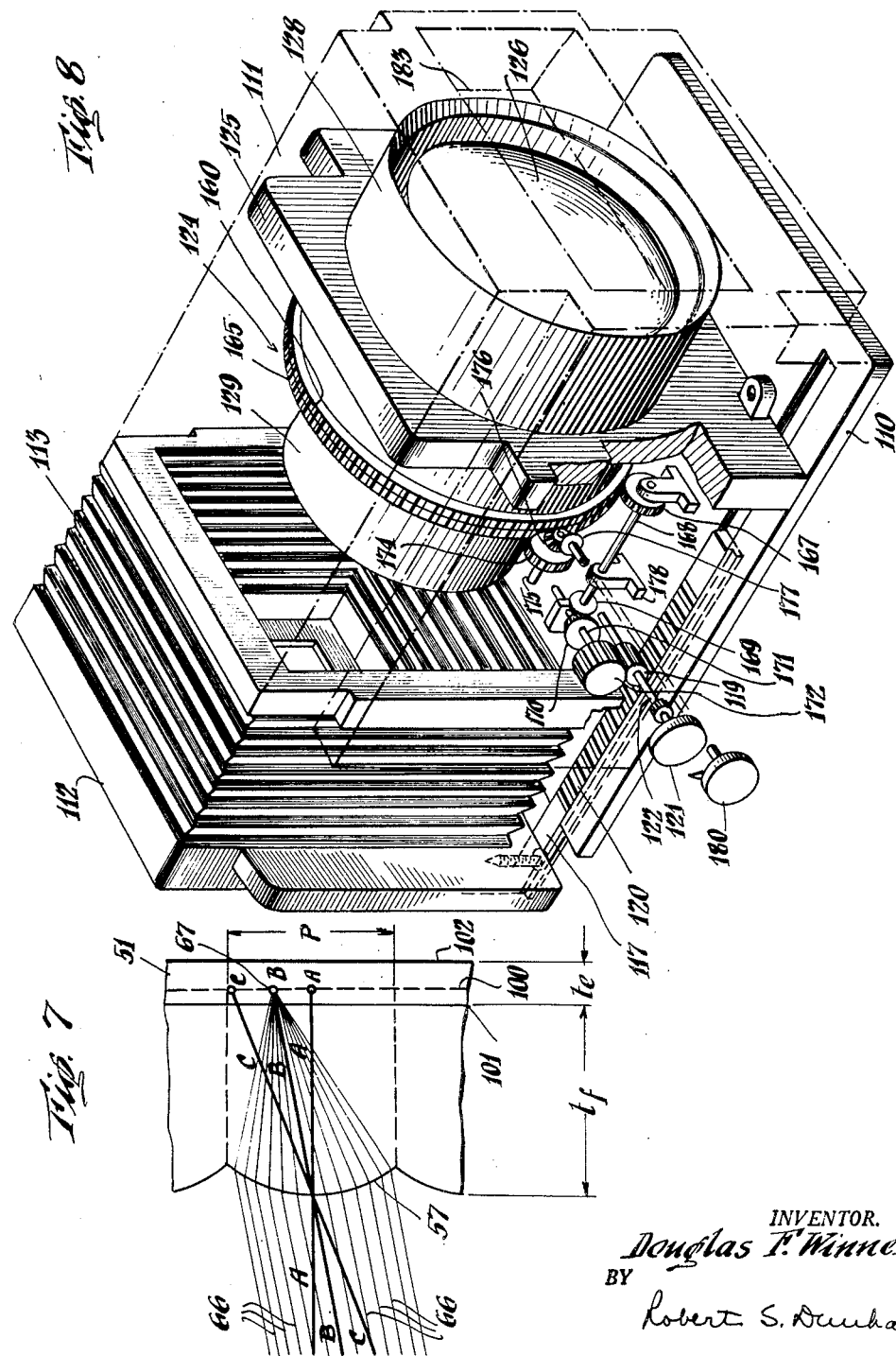

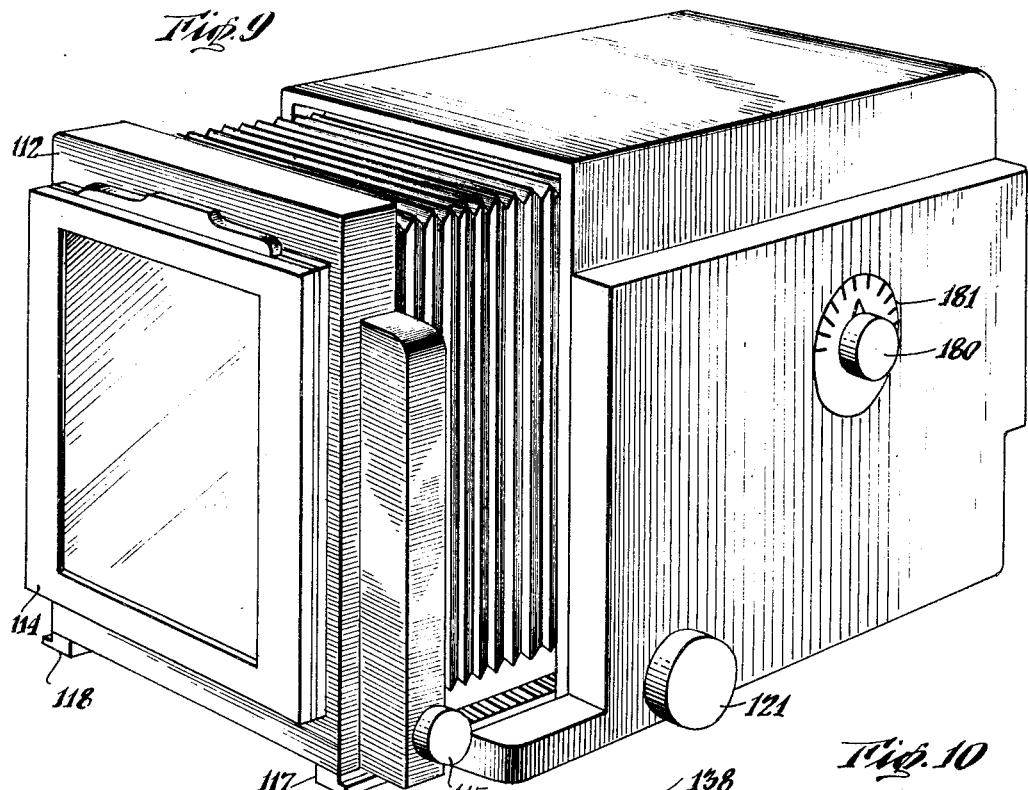
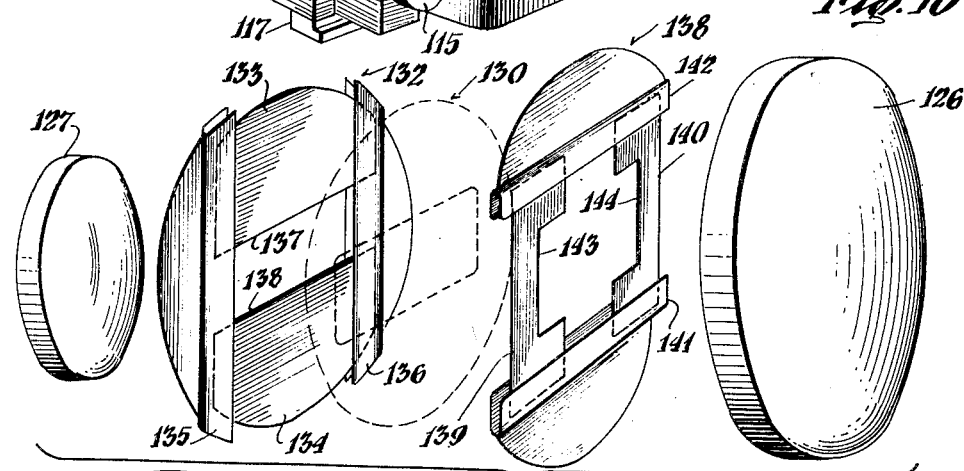
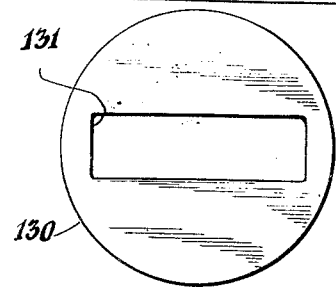

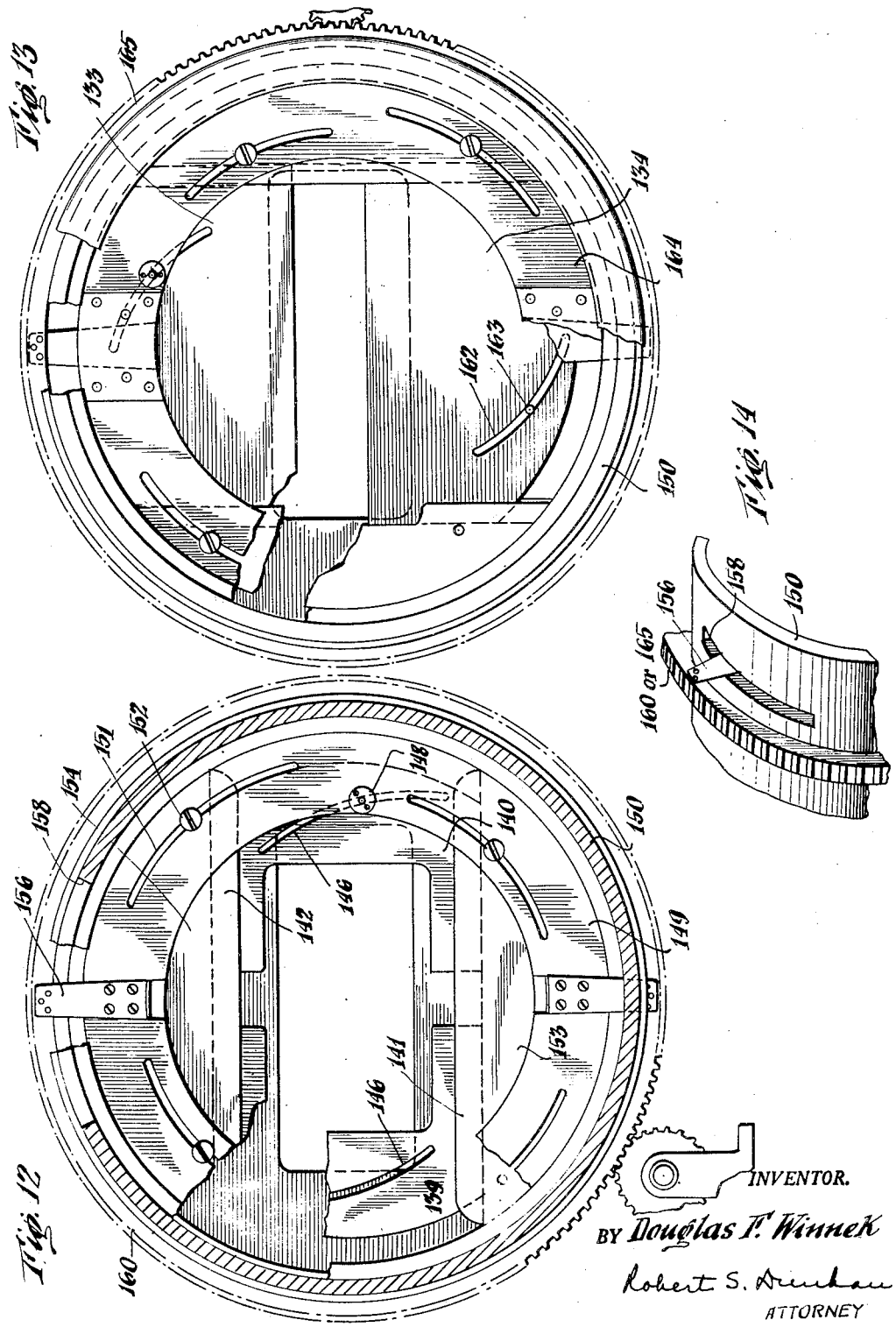

July 24, 1951 D. F. WINNEK 2,562,077
COMPOSITE STEREOGRAPHY
Filed Aug. 29, 1947 11 Sheets-Sheet 6

INVENTOR.
Douglas F. Winnek
BY
Robert S. Dunham
ATTORNEY

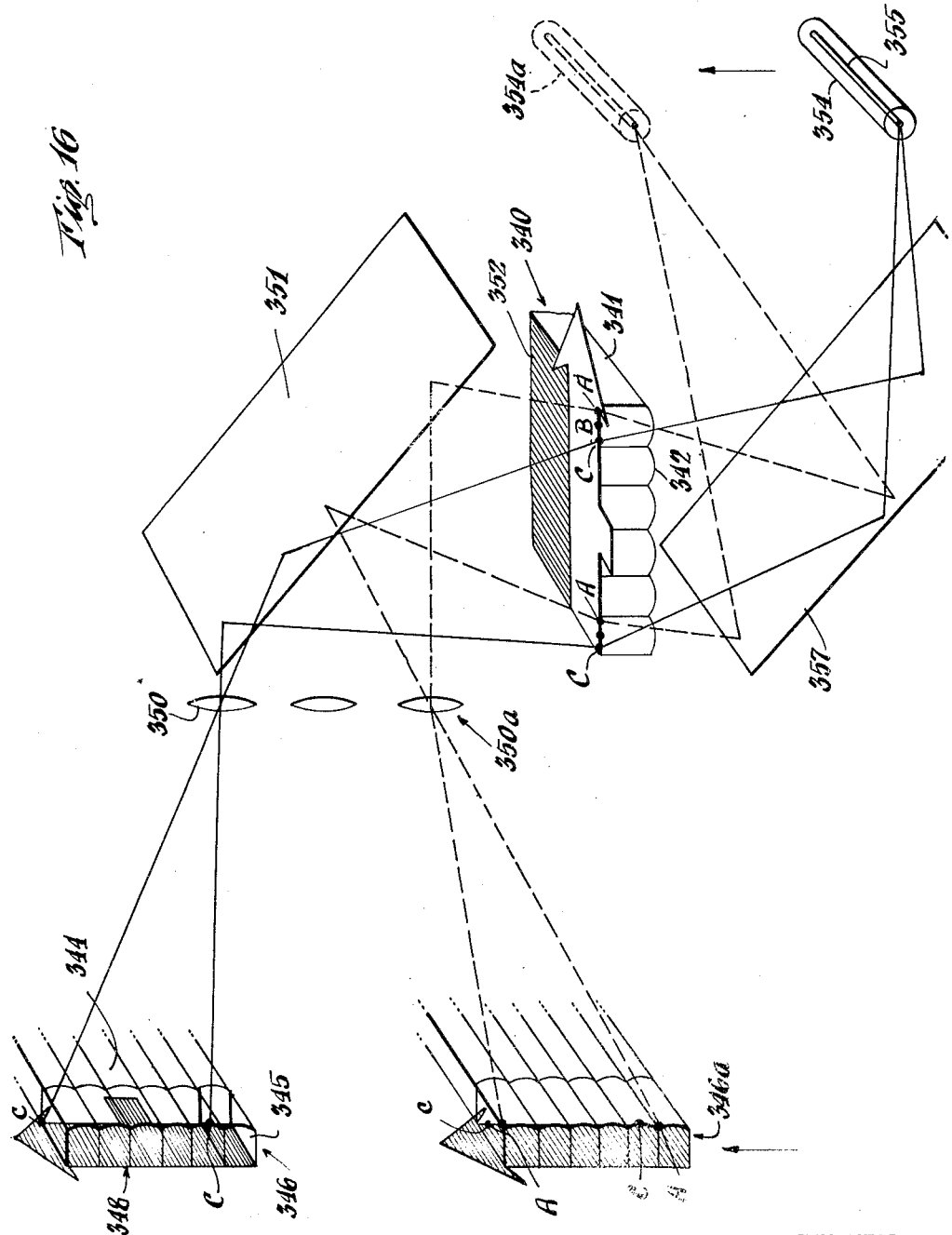

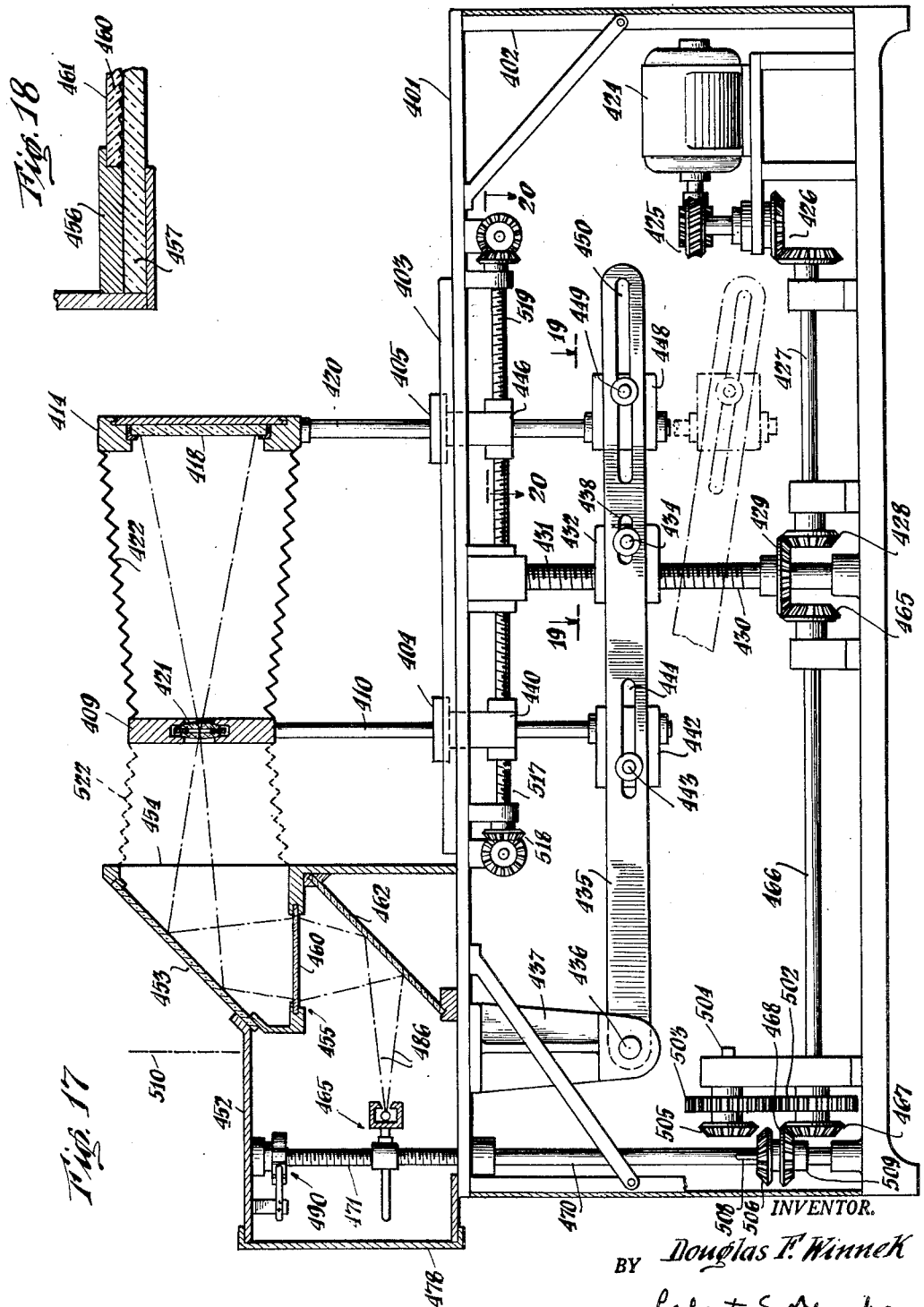

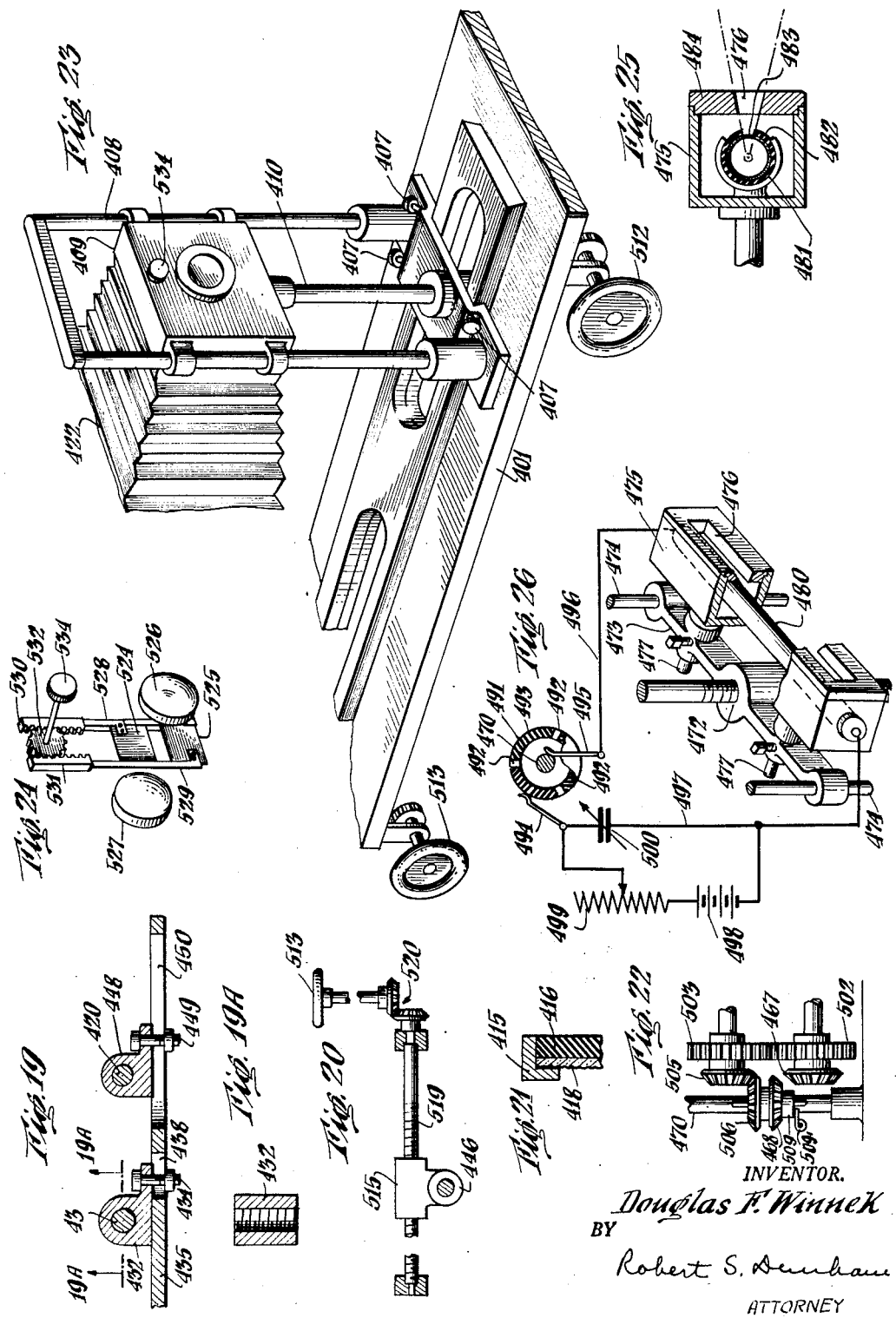

July 24, 1951  D. F. WINNEK  2,562,077
COMPOSITE STEREOGRAPHY
Filed Aug. 29, 1947  11 Sheets-Sheet 10
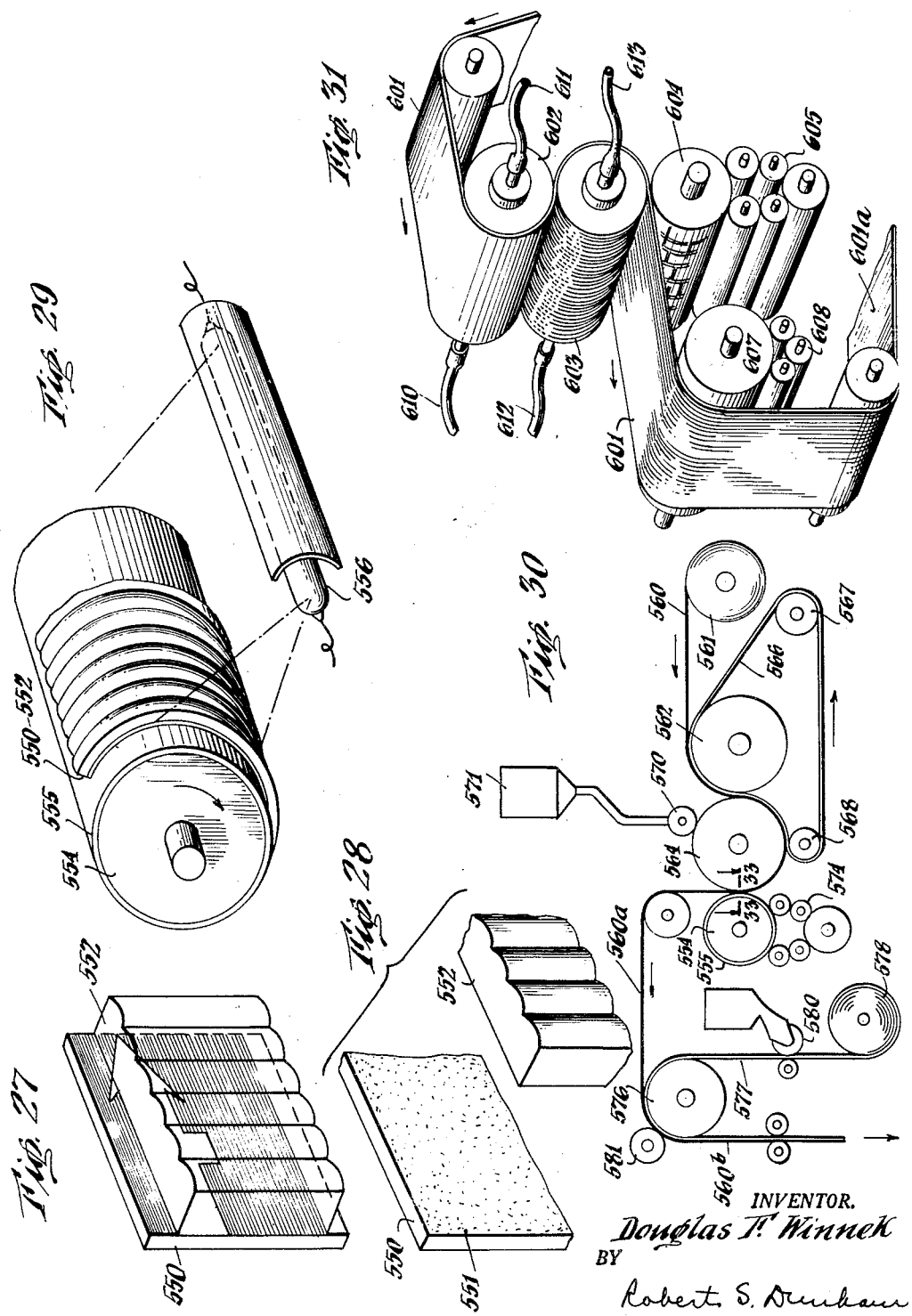
INVENTOR.
Douglas F. Winnek
BY
Robert S. Dunham
ATTORNEY July 24, 1951
D. F. WINNEK
2,562,077
COMPOSITE STEREOGRAPHY
Filed Aug. 29, 1947
11 Sheets—Sheet 11
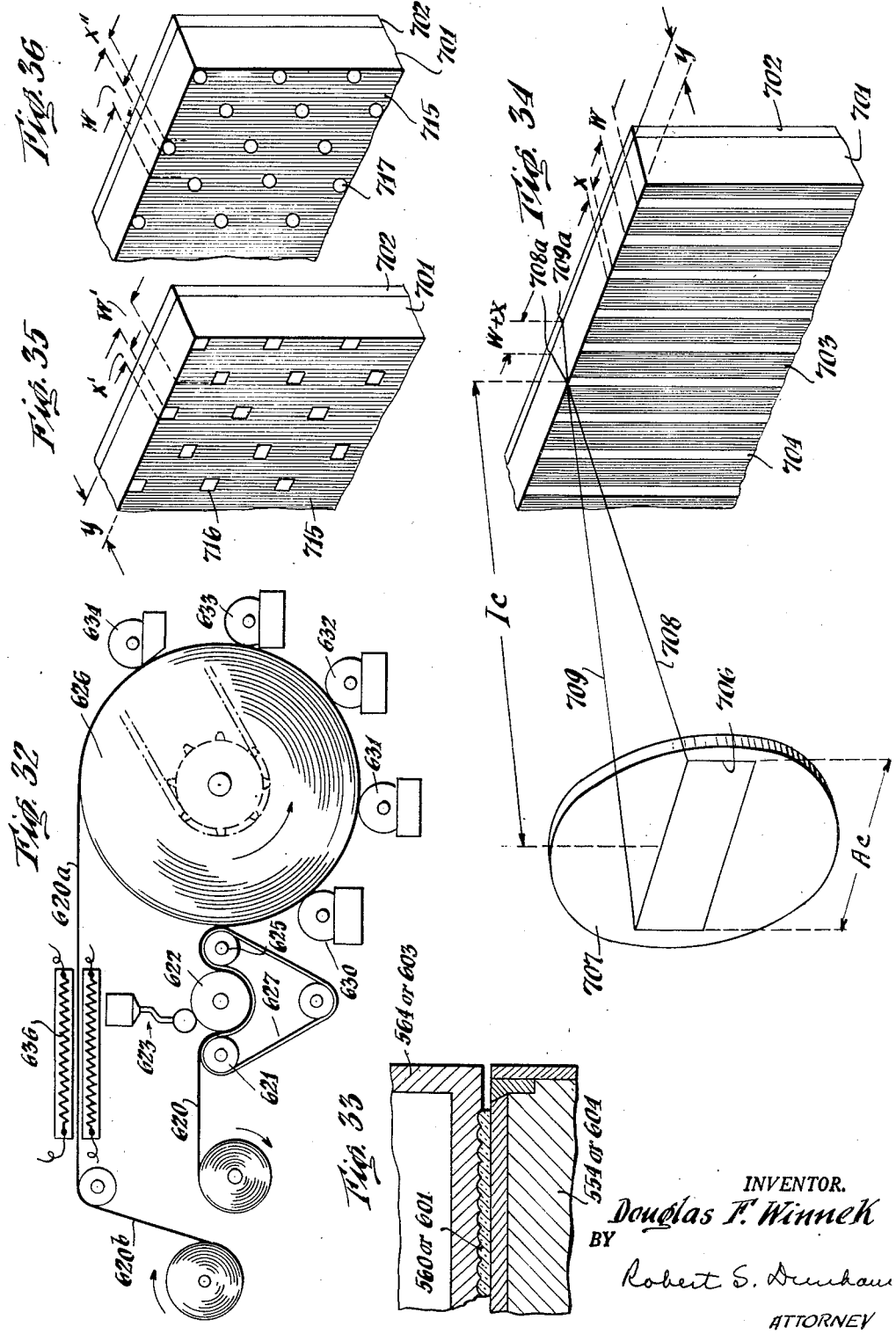
INVENTOR.
Douglas F. Winnek
BY
Robert S. Dunham
ATTORNEY Patented July 24, 1951

2,562,077

UNITED STATES PATENT OFFICE 2,562,077

COMPOSITE STEREOGRAPHY

Douglas F. Winnek, Atlantic City, N. J.

Application August 29, 1947, Serial No. 771,219

23 Claims. (Cl. 95—18)

This invention relates to the depiction of objects in relief, e. g. the production of pictures having stereoscopic characteristics. In a more specific sense, the invention is directed to the art of composite stereographs, by which is meant relief pictures that are made with or viewable through a resolving screen of predetermined character, and that comprise a series of picture componets each in effect divided into separately observable elements representing different viewing aspects. For example, a primary purpose of the invention is to produce, photographically or by imprinted reproduction, a stereoscopic picture which is viewable with the aid of an immediately adjacent lenticular or like screen, e. g. a transparent screen that is arranged integrally with the picture and that has a multiplicity of fine parallel ridges, the resulting picture sheet or device being such as to present a faithful three dimensional effect to the observer, when simply inspected in an ordinary manner and without the use of supplemental, ocular viewing devices or the like. In such pictures, the actual marking, i. e. the image actually reproduced in the photographic or imprinted surface, consists of a series of parallel components, corresponding to the lenticulations of the screen, and each component may in turn be considered to consist of a multiplicity of fine, parallel "aspect elements," each of which represents a minute element of the object depicted, as viewed from a single predetermined aspect.

The effect of the lenticular or other component-resolving screen—the image components and aspect elements being strip-like or linear and being, with the ridges or other focussing elements of the screen, disposed in a vertical position—is to present to a given point of observation only a single aspect of the object, i. e. by permitting light from only a predetermined, corresponding aspect element of each component to reach such point of observation. In consequence when the picture is seen with binocular vision, the eyes at different points of observation thus see different aspects of the object and the picture stands out in natural relief. Furthermore, in accordance with the practice of the present invention, lateral movement of the observer, within a considerable range, produces a corresponding effect of movement in the object of the picture, viz. relative movement of near and remote things in exactly the same manner as is produced by such movement of an ovserver viewing a natural scene.

In a preferred aspect of the invention, the final stereoscopic picture, whether produced by photography or imprinted reproduction, comprises with the screen, a unitary structure, viz. a paper or paper-like sheet when the picture is to be viewed by reflected light, or a single film, plate or similar sheet when the picture is to be seen by light transmitted through it, e. g. as a so-called transparency. For example, an opaque picture may comprise a sheet of transparent material which has the composite image printed on its rear side, backed by a sheet of paper, with lenticulations permanently figured in the front surface of the transparent material; or a positive photographic transparency may comprise a sheet of film of the usual composition employed for photographic work, figured with lenticulations on one surface and carrying on its other side an image developed from a photographic emulsion, the image having a composite character as above. It will also be understood that a variety of other types of picture-carrying structures may be provided in accordance with the invention, for example as hereinbelow described.

For the sake of uniformity, the term "stereoscopic," although sometimes used in a broader sense to include the connotation of inverse relief, is generally used herein to describe pictures which when viewed display their object in natural relief, i. e. with portions which were in the foreground of the original scene appearing likewise in the viewed picture, and background parts or things of the original scene appearing as if in the background of the reproduction. In one method of making relief pictures by photography, the immediately obtained image, i. e. on the film or plate in the camera, has the characteristics of reverse or inverse relief, i. e. in that when viewed through a lenticular screen (which may be embodied in the film), originally near objects are in effect remote and background objects seem to be ahead of others. Such depiction has been conveniently described as pseudoscopic, and reference herein to composite stereographs generally, or to relief pictures or to the depiction of objects in relief, is intended, unless the contrary appears, to include generically both stereoscopic and pseudoscopic reproduction. Although for most purposes it is desired that a relief picture, for instance as produced in accordance with the present invention, be truly stereoscopic, the production of pseudoscopic pictures may be a convenient, integral part of certain procedure according to the present invention, and may also have independent utility.

As indicated hereinabove, lenticular screens, including lenticular films and lenticular viewing surfaces as embodied in photographed or imprinted pictures, preferably comprise an array of parallel ridges, immediately adjacent each other, and each having the structure and effect of a lens with a cylindrical or similar curved surface. A chief purpose of the present invention is to provide for relief pictures with lenticular or other component-resolving screens of such character that when the picture is viewed the individual ridges or lenticulations, or other focussing elements, appear smaller than the optical resolving limit of the human eye, or at least of the order of such limit, whereby the observer is not disturbed by lines or apparent lines across the picture. Thus for example, having regard to the fact that photographs, book illustrations and the like are ordinarily viewed at distances from one to two feet, the term fine-element stereography may be applied to the production of picture structures wherein the lenticular or other screen has not less than about one hundred and fifty resolving elements per inch, a preferred feature of the invention being the provision of stereographic pictures employing viewing surfaces with two hundred to two hundred and fifty or more linear focussing sections per inch.

It may be pointed out that whereas the prior art includes proposals by others to make pictures which can be viewed with lenticular or ruled screens so as to have a relief effect, the nature of the methods and apparatus thus proposed has prevented the attainment of anything beyond a relatively coarse subdivision of the image by the screen—e. g. a maximum of about fifty lines per inch—with the result of poor definition, a relatively crude or incomplete relief effect, and the disturbing appearance of visible lines or corrugations across the scene. Thus an important object of the present invention is to provide improved methods, articles and apparatus whereby sharp, clearly focused and defined pictures of remarkably effective stereoscopic character may be produced, free of disturbing lines, undulations, moiré patterns or the like.

Another outstanding object of the invention is to provide new, convenient and more efficient means and procedure for making relief pictures of desired character as explained hereinabove, for example to produce such pictures by photography, to reproduce them photographically and also to permit and effectuate the making of such pictures, e. g. as photographically recorded in the first instance, by imprinted reproduction, the last mentioned term being intended to refer to printing-press processes or the like as distinguished from pictures or prints made by pure photography, i. e. by the exposure and the development of a photo-sensitive emulsion.

A further and extremely important object is to provide remarkably effective procedure and means whereby relief pictures may be reproduced photographically, and especially to provide such equipment and procedure whereby pseudoscopic images such as pseudoscopic negative films may be converted and reproduced as stereoscopic prints, viz. as either transparencies or opaque positive prints. It may be noted that the conversion of pseudoscopic pictures to true stereoscopic form has been an outstanding problem facing the proposals of others in this general art, a problem of peculiar severity in connection with fine-element stereography such as contemplated by the present invention. Other objects are to provide apparatus of the character stated, e. g. for photographic reproduction of pseudoscopic or stereoscopic pictures, wherein enlargement or reduction of the image may be effectuated, for instance to provide enlarged stereoscopic prints from pseudoscopic negatives, all in a convenient manner and without, for example, the requirement of dimensional identity or even an exact dimentional proportionality between the resolving screen elements associated with the original image and those of the enlarged image.

A further object is to provide improved cameras and like equipment for stereographic work, e. g. for taking relief pictures, preferably under conditions desirably controlled in accordance with further principles of the present invention as hereinbelow explained. An additional object is the provision of means and methods for making imprinted reproductions of relief pictures, i. e. so that unlimited numbers of copies may be made of a selected stereoscopic picture by a printing press procedure, such improved means and methods including new steps and apparatus for producing plates and for the actual printing operation, as well as for applying to or incorporating in the finished picture, the desired viewing screen. Still further objects include the provision of new and improved methods of stereography whereby more natural and more easily observed stereoscopic effects are obtained with exceptionally realistic qualities of form, proportion and perspective in the depicted object; to provide improved lenticular film or like photo-sensitive structure for taking relief photographs or for copying them; and to provide mechanical and like structures of novel and unusually effective character in stereographic equipment of the character described.

To these and other ends, including a variety of further objects hereinbelow mentioned or otherwise incidental to the practice or use of the features of improvement herein disclosed, certain embodiments of the invention are set forth by way of example in the following description. Such embodiments and other features and characteristics of the invention are also illustrated in the accompanying drawings, and it is believed that such description and illustration will serve to demonstrate the various features and principles of the invention.

Referring to the drawings:

Fig. 1 is a perspective diagrammatic view showing photographic recording of a relief picture;

Fig. 1A is an enlarged fragmentary view of a film useful for relief photography;

Fig. 2 is a perspective diagram illustrating observation of a stereoscopic picture;

Fig. 3 is a perspective diagram showing the pseudoscopic nature of a negative directly made by the system of Fig. 1;

Figs. 4 and 5 are optical diagrams showing features of a photographic system employed in the present invention;

Fig. 6 is an optical diagram showing certain dimensional relationships in observation of a relief picture;

Fig. 7 is an optical diagram, very greatly enlarged, of a photographic film used for taking relief pictures;

Fig. 8 is a perspective view of an improved camera according to the present invention;

Fig. 9 is a perspective view of the opposite side of the camera;

Fig. 10 is an exploded, isometric, diagrammatic view of certain shutter and lens arrangements in the camera;

Fig. 11 is an elevation of a fixed diaphragm embodied in the camera;

Figs. 12 and 13 are vertical cross-sections taken at spaced localities and viewed toward each other, showing, with certain portions broken away, the arrangement of certain front and rear movable diaphragm systems of the camera;

Fig. 14 is a fragmentary detail diagrammatically illustrating the actuator for a movable diaphragm such as shown in Figs. 10, 12 and 13;

Fig. 16 is a similar view of another form of such arrangement;

Fig. 17 is a side elevation, partly in section, of a scanning projection printer according to the invention;

Fig. 18 is an enlarged section showing the object film in position in the apparatus of Fig. 17;

Fig. 19 is a fragmentary horizontal section on line 19—19 of Fig. 17;

Fig. 19A is a vertical section on line 19A—19A of Fig. 19;

Fig. 20 is a horizontal section on line 20—20 of Fig. 17;

Fig. 21 is a fragmentary vertical section showing the image receiving film in position in the apparatus of Fig. 17;

Fig. 22 is a fragmentary view of a certain lamp driving mechanism of Fig. 17 in a position for reverse drive;

Fig. 23 is a perspective view of the projection lens and optical table of the apparatus of Fig. 17;

Fig. 24 is an isometric view of a diaphragm arrangement for the projection lens of the apparatus of Figs. 17 and 23;

Fig. 25 is an enlarged vertical section of the lamp chamber of Fig. 17;

Fig. 26 is a perspective view of the lamp chamber and its support, with a wiring diagram for the lamp;

Fig. 27 shows an arrangement of film and screen to produce a negative suitable for making a printing plate;

Fig. 28 illustrates the separate character of film and screen of Fig. 27;

Fig. 29 illustrates in perspective view, the making of a contact print on a cylindrical printing plate blank;

Figs. 30, 31 and 32 are respectively diagrammatic views of different embodiments of printing presses in accordance with the invention;

Fig. 33 is an enlarged fragmentary section showing the operation of co-acting printing and embossing rollers such as embodied in Figs. 30 and 31;

Fig. 34 is a perspective view showing projection in a camera, as in Fig. 1 but employing a transparent line screen; and Figs. 35 and 36 are similar, greatly enlarged views of photographic films embodying screens comprising small square and round apertures, respectively.

Figure 15:
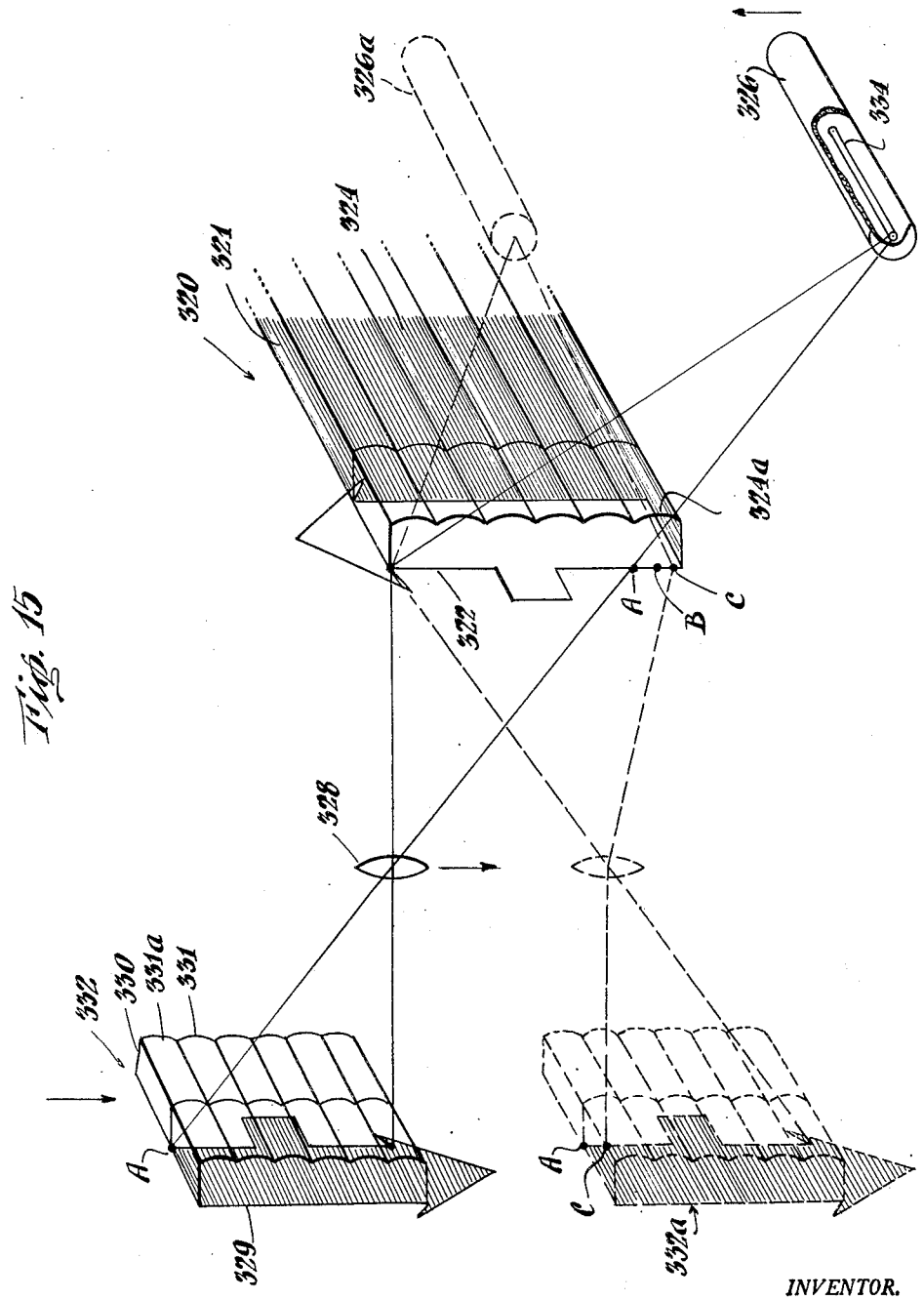
Fig. 15 is a perspective diagram showing one form of a scanning projection-printing arrangement according to the invention.

By way of introduction and also to explain certain principles underlying important aspects of the present invention, reference is first made to Fig. 1, which in a very simplified and diagrammatic manner illustrates an arrangement for relief photography, i. e. a camera taking a relief picture or composite stereograph. Whereas in some cases, a scanning arrangement with a relatively small lens, or a projection system embodying a plurality of lenses, may be employed, the apparatus shown comprises a large lens 50 arranged to project upon a sensitized surface 51, i. e. a photographically sensitive emulsion, layer or the like, an image of any desired object or scene. An object to be photographed is here diagrammatically represented, for the sake of simplicity, by an arrow-shaped figure 52 which is disposed in a horizontal position and has a point 53 at one end, an opposite blunt end 54, and a downwardly projecting stub 55 at its center, these configurations being adapted to afford clear illustration of the nature and disposition of images produced in various ways as hereinbelow explained. It may be further understood, for example, that the arrow is of a dark shade of color, viewed against a light background.

The sensitized surface 51 is faced by a lenticular screen 56 comprising essentially a sheet of transparent material embossed or otherwise figured to have a multiplicity of parallel, contiguous vertical ridges 57 facing outwardly, i. e. toward the lens 50. The face of each ridge is shaped to provide the characteristics of a cylindrical lens, for example by constituting a section of a cylindrical surface, with the result that a bundle or pencil of essentially parallel light rays striking the surface of a given ridge will be focused by the latter as a line-shaped image in a plane at or adjacent the rear surface of the screen, the image thus occupying a region having an extremely minute horizontal dimension (or "diameter of confusion") and a vertical dimension equal to that of the incident bundle or pencil of rays. Thus if a single ridge 57 is illuminated throughout its length with parallel beams, the focused image will constitute a vertical line, and for the present it may be assumed that the focal plane of the ridge lies at the rear surface of the screen, coinciding with the sensitive surface 51.

For the attainment of a relief effect in the recorded image (by analogy to the stereoscopic effect of direct binocular vision) the object 52 must be viewed from a plurality of aspects spaced along a horizontal line, e. g. at the region of the lens 50. In accordance with presently preferred practice of this invention, the object is so viewed by the lens, i. e. at a multiplicity of points along the line 58, and the total extent of the line, and thus the extreme divergence of possible aspects, are more than a single pupillary distance and very preferably equal to a plurality of pupillary distances. It will be understood that the term pupillary distance is intended to represent the spacing between the eyes of a person and thus for average purposes is the equivalent of about $2\frac{1}{2}''$. Accordingly the lens 50 has a diameter, e. g. measured along the horizontal diametrical line 58 at least equal to and preferably greater than a pupillary distance, and simply for the sake of illustration is shown in the diagram as having a length of something more than $1\frac{1}{2}$ pupillary distances.

To reveal its optical character the dimensions of the screen 56 have been tremendously exaggerated in Fig. 1 relative to other elements of the system, which themselves are shown in a diagrammatic manner and without necessarily having a true or practical proportionate relationship to each other. As will be further explained below, the thickness $t_i$ of the screen may ordinarily be of the order of $\frac{1}{100}$ of an inch or less, while the ridges 57 may have a width $p$ of the order of $\frac{1}{200}$ of an inch or less. Thus Fig. 1A, illustrating a fragment of a screen 56 provided with the same character of ridges 57 and backed with a photosensitive emulsion 51, shows the nature of the screen more clearly, i. e. in that it comprises a great multiplicity of such ridges across its horizontal extent; although it will be understood that Fig. 1A is itself very greatly enlarged. In practice, the actual structure may comprise a photographic film base 56 of a composition commonly employed for photographic work, having the ridges 57 embossed on one surface and carrying a sensitive emulsion 51 on its opposite surface.

Referring again to Fig. 1, it may be assumed that diverging rays of light 60, 61 and 62 proceed from an illuminated point 63 at the bottom of the arrow near its blunt end 54. These rays selectively taken as in a substantially horizontal plane, and also identified respectively by the letters A, B and C, may be considered as reaching the lens 50 at three points successively spaced by the average pupillary distance. In other words, if a person were located at the right hand side of the lens, looking toward the object 52, his right eye 64 will receive the ray A, while his left eye 65 receives the ray B. Hence rays A and B represent respectively right and left eye aspects of the point 63 when considered relative to each other at the region of the lens 50. It will be apparent that if the head of the observer moves leftwardly at the position of the lens, his right eye may receive the ray B and his left eye the ray C, whereupon these rays represent corresponding aspects of the point 63 relative to each other.

Let it now be assumed that the lens is properly positioned to bring the rays A, B and C to a focus at the sensitive surface 51 or at the surface of the ridges 57, the lens 50 having in effect sufficient depth of focus, particularly by reason of characteristics more fully explained below, so that a sharp image is obtained in any of a number of planes in the immediate vicinity of the film structure. The rays A, B and C may thus be said to be focused on the emulsion 51, tending to form an image there which (resembling a very short horizontal line) has a satisfactorily minute extent or "diameter" of confusion in a vertical direction. At the same time the additional focusing action of the lenticular ridge 57a in the path of these specific rays brings them individually into sharp focus (as points, or more strictly, small "areas of confusion" each preferably having no more than a predetermined small horizontal diameter, and a vertical dimension governed by the main lens 50) at separate points identically designated C, B and A on the sensitive emulsion 51.

If the image on the emulsion is developed and then viewed from a suitable position such as the location of the lens, rays respectively reaching the right and left eyes of the observer from the picture component beneath the ridge 57a will actually correspond to different aspects, i. e. different ones of the several elements A, B and C. As explained below, the immediately produced image in a camera arrangement like Fig. 1 actually has an inverse relief, i. e. is pseudoscopic; but nevertheless the image is in fact stereographically composite, and provides an observer with different aspect views (although in the wrong order) for each of his eyes, in such manner as to yield a relief effect.

Actually a great multiplicity of rays reach each lenticulation such as 57a from the corresponding multiplicity of points across the lens diameter 58, but for simplicity of optical explanation they may be considered as comprising successively adjacent groups of rays each group being represented by a beam or pencil of single direction. Thus referring to the further enlarged diagram of Fig. 7, it will be noted that the ray B may be taken as accompanied by a number of parallel rays 66, which by the focusing action of the lenticulation 57 are brought to convergence at essentially a single point 67 in the emulsion 51, here shown as if enlarged to very considerable thickness. That is to say, in relation to the actually minute width of the lenticular ridge and its effective focal length, all rays coming to any such ridge from an original point on the object may be properly considered as parallel to each other. Similarly, although not shown, other pencils or beams striking the ridge 57, such as represented by the rays A and C, would likewise consist of a bundle of essentially parallel rays, thus brought to focus at corresponding points of the emulsion.

It will be noted that for diversity of illustration, the screen of Fig. 7 is shown as if primarily intended for a camera lens of relatively greater width than in the scheme of Fig. 1, in that if the lenticulations are proportioned in the preferred manner described below, and the specific rays or pencils A, B and C are taken to be separated by pupillary distances, the screen will accommodate other pencils or beams spaced beyond those indicated, i. e. focussed at points throughout the adjacent half of the emulsion area that corresponds to the width of the lenticulation.

For the sake of clarity the complete image 68 of the object arrow is shown in Fig. 1. In accordance with the principles of optics the image is reversed and inverted relative to the object, and where the emulsion is of the usual sort, the reproduction is a negative, i. e., with the arrow light and the background shaded. For further illustration the aspect elements C, B and A in the emulsion 51 are shown to continue as vertical lines across the body of the arrow, each of which would correspond to points in a vertical line above the point 63 of the object 52, it being thereby understood that within each image component (which corresponds to one lenticulation) the aspect elements are separated horizontally and are in effect vertical linear strip images of the same vertical strip of the original object or scene, or more exactly, images of what is seen by looking from different aspects toward a single vertical strip or line in a selected plane (called the "datum" plane) of the scene.

It should also be understood that the relation between the image components and their aspect elements, and the complete image 68 is only represented diagrammatically in Fig. 1 and other figures of similar character in the drawings. In actual practice the aspect elements A, B and C are extremely close together and in fact are interspersed with other elements representing aspects of intermediate viewing angles; indeed each complete components strip itself, corresponding to the width of one lenticulation 57a and containing a full set of aspect elements, is preferably smaller than can be resolved by the unaided eye at the intended viewing distance. In these figures the tremendous, disproportionate enlargement in size and spacing of the components and their elements relative to the arrow image 68 (and thus to the object 52), especially along a horizontal scale, has been deliberately adapted to permit showing in a single view both the disposition and character of the image, and the disposition and character of the aspect elements exemplified by A, B and C.

Although the specific object 52 has been shown as lying in a single plane, it will be understood that the illustrated principle of stereoscopic or multi-aspect reproduction produces a full relief effect in a corresponding picture of a three-dimensional scene. For instance, referring to Fig. 1, and assuming that some object exists at the point $A_n$ in the plane N forward of the object 52, the right eye 64 would see the object $A_n$ whereas left eye 65 would look past a corresponding locality $B_n$ and would see the point 63 of the arrow. In the reproduced image the aspect elements B and A actually represent the origins of the corresponding rays, so that upon viewing this image through the screen 57 eyes placed at A and B in the lens region 58 would see correspondingly different things, creating the illusion of relief. The same three-dimensional effects would be produced for objects in a more remote plane, as at F; to the extent that one or another of the objects $A_f$, $B_f$ and $C_f$ might be visible along one or another (but not all) of the paths A, B and C without obstruction in nearer planes, such objects will be seen in selected (but not all) aspects of the ultimate picture. In a pseudoscopic image the relations of distance are reversed but upon converting the picture to a true stereoscopic one, e. g. as explained hereinbelow, the near and far portions of the scene are properly oriented.

In practice, the lens 50 is usually provided with a diaphragm arrangement restricting its actual opening to a horizontal slot-like region between lines 70, 71. In this way, the photographic speed of the lens is effectively the same throughout its width, and there is a further advantage in that the depth of focus of the lens is greatly increased for vertical lines or dimensions in the scene. In a vertical sense the lens thus has the depth of focus which would characterize a lens of much smaller opening, or of much larger focal ratio, i. e. corresponding to the actual vertical distance between the lines 70, 71. At the same time, in taking an ordinary photograph with a lens of unusual width (and small or fast focal ratio) the depth of focus is relatively slight, and the same is true of such use of the effective lens opening 70—71 in a horizontal sense. For instance if the lens is focused for the exact plane of the object 52, objects in planes N or F would be badly out of focus in a horizontal sense, on a simple photographic plate. However, the selective effect of the lenticular screen 56, amounting to a separation of rays of different aspect into separate images which can only be viewed individually, is to increase the depth of focus tremendously in ultimate stereoscopic observation.

In such case, for instance, although different objects $A_n$, $B_n$, $C_n$, in plane N are brought to a focus at the same point or lenticulation in the film 56, the resolving effect of the screen separates them at A, B, C in the emulsion 51 so that each eye of the observer only sees the image of one of the objects at such point. Likewise although rays (not shown) other than the ray 60 or A from a single point such as $A_n$ are focussed at different points (or lenticulations) in the film 56, they have different aspects angles and the screen correspondingly resolves their images, with the effect that each eye of the observer sees only one such image and the two images thus seen appear superimposed, i. e. as if in focus, at a plane spaced from that of the emulsion 51. These focus-sharpening effects are ordinarily masked by the aspect reversal in a pseudoscopic image, but they are fully realized in a stereoscopic print made from the latter. Hence in both vertical and horizontal directions the cooperative use of the diaphragm 70—71 and the resolving screen 56 gives the stereoscopic picture a remarkable depth of focus, as if it were taken with a lens of much smaller aperture than the lens 50.

It will now also be seen that the apparent location of various objects in the final picture relative to the actual plane of the picture itself may be controlled, within useful limits, by the specific focusing adjustment of the taking lens 50. If as in Fig. 1 the film is positioned so that objects in the plane of the arrow 52 are brought to sharpest focus in the ordinary photographic sense, the relationships explained above will reproduce nearer and further objects so that they appear actually to be spaced in the same way from the stereoscopic picture surface. If another object plane such as N is selected for sharp focus in the film, it will then be the one which always has the same appearance to the observer's eyes, i. e. in the plane of the picture surface, and objects in the planes 52 and F will seem to lie behind the picture plane. As stated above, the selected plane of focus—e. g. that of the arrow 52 in Fig. 1—is called the datum plane, and ordinarily should be chosen in some central region between front and rear of the object or scene to be photographed.

The pseudoscopic character of the negative image 68 may be better understood by first examining the nature of a truly stereoscopic, positive view, seen through a lenticular screen, i. e. as in Fig. 2 wherein such view 74 is positioned on the rear face of the screen 75. The print 74 may be a so-called transparency, illuminated by a source of light 76 behind it; the same optical effects would be achieved by reflective illumination of an opaque image, i. e. with light from the screen side. In Fig. 2, an observer having his right and left eyes at the positions 77 and 78 respectively will receive corresponding light rays 79, 80 from the lenticulation 82. Comparing this diagram with the illustrative disposition of the observer's eyes 64, 65 in Fig. 1, it will be seen that in order to obtain the proper relationship of aspects as derived with the natural scene or object, the ray 79 should correspond with the ray 60 of Fig. 1 and the ray 80 with the ray 61 of Fig. 1, these rays being therefore respectively designated A and B.

By virtue of the lenticular character of the ridge 82 it will also be noted that in the picture itself the relative disposition of the aspect elements A and B within the component corresponding to the ridge 82 should be as shown in Fig. 2, for a truly stereoscopic image, i. e. to obtain the external relation of the rays as explained above. The ray 81, corresponding to the ray C, should be disposed in the same relationship as in the natural scene of Fig. 1 in the region of the observer and must therefore originate at a point C located as diagrammatically shown in Fig. 2, in the image component 82. Specifically, the aspect element points A, B and C are disposed in the stated order within the image component, the element point A being nearest the blunt end 84 of the arrow 74.

Fig. 3 shows the developed pseudoscopic image 68 of Fig. 1 (and its associated screen 56) turned around, i. e. so as to correspond with the view of Fig. 2. The relative disposition of the aspect elements within the image component corresponding to the ridge 57a, i. e. as originally projected in using the camera system of Fig. 1, will be in the order C, B, A, having the element point C nearest the blunt end 85 of the arrow 68. Consequently an observer having his right and left eyes at the positions 87, 88 to perceive the rays B and A, will have these rays transposed from their order in the original scene, in that his right eye receives the ray B and his left eye the ray A. At the same time the image components will be seen in the proper order relative to the blunt and pointed ends of the arrow. The reversal of the order of the aspect elements with respect to the position of the image component of which they are a part, constitutes a reversal of true stereoscopic presentation, and in fact exhibits an unfocused appearance, in inverse relief, to the observer at 87, 88. As stated above, such an image is called pseudoscopic.

It will be understood, however, that many of the necessary or desired physical relationships of the several parts of the camera, screen, film and the like which contribute to the sharpness, brilliance and natural relief of the ultimate stereoscopic print are applicable to the production of pseudoscopic as well as stereoscopic pictures, in that the attainment of the improved qualities in the ultimate print is only reached by making the pseudoscopic negative with such observance of the specified relationships as would seem calculated to yield such qualities in the negative itself.

A particular advantage of using a very large lens 50 or other projecting instrumentality operative at a multiplicity of points along a wide region 58, is an improvement in the ease of viewing and particularly in the fidelity of the relief illusion in the final picture. Experience indicates that the three-dimensional effect obtained in viewing a natural scene is a resultant of several factors. About 80% of the effect may be said to be due simply to binocular vision, i. e. in that the right and left eyes see markedly different aspects of the subject. Another 10% appears to be contributed by an effect of motion; for example, as the observer moves his head slightly, objects at different distances appear to move relative to each other. The remaining 10% of the effect may be occasioned by miscellaneous factors, e. g. the modeling due to light and shade, the focusing of the eyes and the differences in color, intensity and the like that are characteristic of differences in distance of an object from the observer.

A relief picture taken with a wide lens provides not only the direct binocular effect, but also the appearance of relative motion as the observer moves his head sidewise and sees successively different aspects. The motion effect is greatly heightened where the observer can continue to see different aspects as he moves his head through a distance equal in fact or effect to two or more pupillary distances, and thus it is of immeasurable advantage for the camera lens to have a viewing field or horizontal aperture equivalent to at least about two and preferably several pupillary distances. The resulting fidelity to the natural scene is remarkable; objects or parts of objects hidden when looked at from one position come into view as the head is moved, and vice versa. In addition, the picture can be seen more conveniently, since observation is not confined to a single central locality. Moreover, even outside the wide principal viewing field, the observer can also obtain the stereoscopic effect; he will then see the aspect elements of each component through a lenticulation or ridge that is more directly related to an adjacent component, it being appreciated that as he moves his head to such supplemental viewing field or to one of still more remote order, there is a brief interval or position of blurred observation.

For optimum results in many cases, certain relationships have now been found to be peculiarly significant. They can best be explained by taking a specific example, for instance by assuming that it is desired to make a portrait photograph of a person or object.

A first consideration is the distance at which the ultimate picture is to be viewed. For instance, in the case of ordinary portrait photographs 8" x 10" in size, experience shows that the average person looks at such a picture at a distance, from his eyes, of 16" to 18". On the other hand, if the picture is to be seen from a greater distance, e. g. as an advertising display, corresponding account should be taken of such distance. Another factor to be considered, as well as the size of the picture and the manner in which it is to be viewed, is the number of pupillary distances which the viewing space should cover, i. e. the actual horizontal extent of the central viewing space in which the observer can move his head from side-to-side and secure a true effect of motion in the stereoscopic picture. Referring to Fig. 6, where the eyes of the observer are represented at 90, 91 and the object at 92, the viewing distance is designated $l_n$ and the viewing space, i. e. the horizontal distance just described, is designated S, which may thus be measured in pupillary distances (P. D.). If it is desired, for instance, to cover four pupillary distances each taken at the average of 2½", the value of S will be 10".

Referring now to Fig. 4, which shows somewhat diagrammatically a system like that of Fig. 1 including a lens 94 adapted to project, upon a film 95 embodying a lenticular screen 96, a relief image of an object 97, it has now been found that if the horizontal opening of the lens is $A_c$ and the distance of the image from the lens is $I_c$, and if the desired relationship of viewing distance and viewing space is to be achieved in the ultimate picture, the following relation should preferably exist:

$$\frac{l_n}{S} = \frac{I_c}{A_c} \qquad (I)$$

Manifestly if the ultimate picture, to be viewed as at 92 in Fig. 6, is the same size as the actual image field covered by the camera in the film 95, and if the viewing distance $l_n$ will be equal to $I_c$, then the opening $A_c$ must be equal to the selected value of S. Under these or any other circumstances it will now be appreciated that the value of S should be so selected as not to require an impractically large size for the lens. Under present conditions of manufacture and within reasonable limits of cost, satisfactory photographic lenses can be made with effective diameters of 6" to 10" or so, it being understood that if width of viewing field must be sacrificed for the sake of a smaller lens, the latter should preferably have a diameter at least as large or larger than one pupillary distance.

Although many features of the invention may be utilized, and good stereoscopic pictures obtained, without following the above relationship (I), its observance is usually a basis for distinctly superior results. Moreover, this equation is applicable throughout the optical procedure from the taking of the picture to the completion of the finished reproduction, including the step of enlargement by projection; and application of the equation is preferably made in accordance with the general photographic rule that best proportions and perspective are obtained in a picture when the distance between the lens and the image in the last projection of the optical operations is approximately equal to the intended or normal viewing distance.

Under the selected circumstances, the relationship (I) also establishes the preferred horizontal aperture $A_c$ and the preferred image distance $I_c$ of the camera to be used. By reference to Fig. 5 and particularly for situations where a given camera is expected to be used for taking many pictures of a similar type, the focal length required of the lens is then at once readily determinable, by taking into account the "magnification" of reproduction to be achieved in the camera. The latter value may be represented by the ratio of the image distance $I_c$ to the distance $O_c$ of the object from the lens, and then the focal length $F_c$ of the lens is found by the usual lens formulae, which may be generally expressed by equating the reciprocal of the focal length $F_c$, to the sum of the reciprocals of $O_c$ and $I_c$. In so determining the characteristics of the lens, it must be remembered that $F_c$ should not be too small for practical manufacture, having regard to the actual value of the maximum opening or lens diameter, nor should the selected object distance $O_c$ be too great to produce any useful stereoscopic effect.

Similarly in accordance with preferred, although not always essential practice of the invention, the design of the resolving screen may then be determined by the factors mentioned above, with suitable regard for the availability of film or other sheet substance as a material of the film, and also with regard for the desired maximum apparent size of the lenticulations or other resolving structure. For making negatives in a camera of the sort contemplated a photographic film of available character may be embossed with the necessary ridges or lenticulations and carry on its reverse side the usual emulsion, with the proviso, of course, that there be no non-transparent layer on the uncoated surface of the film or between the film and the emulsion. Referring specifically to Figs. 4 and 7 it may be assumed that the selected film has a thickness $t_f$ and the emulsion, although in fact very thin, has a measurable thickness $t_e$.

As indicated above, the ray or pencil of rays constituting a single aspect element within a picture component defined by the width of a ridge, should focus as sharply as possible at a single point in or upon the emulsion. Having regard to the tendency of light to diffuse in emulsions of the usual type, it has now been found, somewhat contrary to the practice in other branches of photography, that the optimum focal point for sharpest definition in the present arrangement is in a plane within the emulsion, at a distance from the screen-engaging face of the latter about equal to one-third of the total emulsion; i. e. the distance of the desired focal plane 100 from the interface 101 in Fig. 7 is equal to one-third of the total emulsion thickness between its surfaces 101 and 102.

The relatively critical nature of the focus by the lenticulation, i. e. in that the latter should be an optical element of rather "wide-angle" character and yet should at least bring the rays of a given aspect element to as sharp a focus as possible somewhere within or on the emulsion, will be apparent from what has been said hereinabove. The camera lens itself manifestly will seldom have a focus critical in distances comparable to the emulsion thickness, and in fact will ordinarily be desired to have considered depth of focus. In any event, the lenticulation or like resolving structure is a cooperating optical system, which subdivides a minutely small opening of the image into separate aspect elements recorded on the film in a side-by-side relation, and which also serves to complete the focus of the lens, in a horizontal sense as already explained herein. Unless the resolving screen properly separates and allocates, so to speak, the multiplicity of aspect elements within each minute image component on the emulsion, the desired stereoscopic effect will not be realized to a maximum extent.

Assuming that the rays of a given aspect element are essentially parallel across the face of a single lenticulation, then if the width or "pitch" of the latter is $p$ and its focal length is $F_r$, the following relationship exists, providing the full extent of the film is utilized behind each ridge without overlapping of elements corresponding to adjacent ridges:

$$\frac{I_c}{A_c} = \frac{Fr}{p} \qquad (II)$$

As explained above, the focal length is preferably determined by $$F_r = t_f + \frac{t_e}{3} \qquad (III)$$

The value of $p$ can be independently determined within a range governed at its upper limit by the desirability of having the ridges too small to be individually noticed and at the lower limit by practical requirements such as those of accurate manufacture. Ordinarily the limit of resolution of the human eye is about one minute of arc, so that to avoid seeing the ridges at a distance of 16" the width of each should be not more than about $1/200$ of an inch. Then to select a film thickness suitable for a desired width $p$ of the lenticulations, Equation II above may be solved, assuming for this purpose that the thickness $t_f$ is equal to the lenticular focal length $F_r$.

A final factor to be determined is the radius of curvature $r$ of the cylindrical ridge surface. Knowing the index of refraction $n$ of the selected film, the value of $r$ can be obtained from the established formula governing, at least approximately, the refraction of parallel rays at spherical or cylindrical surfaces, viz.

$$r = F_r \left( \frac{n}{n-1} \right) \qquad (IV)$$

It will now be seen that the optimum values of all design factors for the film and camera are thus readily determinable, for a given character of work and for given circumstances of ultimate use, by following the relationships explained above. Manifestly, of course, considerable divergence from these desiderata may be tolerated in many cases, particularly in that a camera or lenticular screen designed for one kind of scene or one type of use of the picture may be employed to satisfactory effect in other situations.

In most cases, however, it is of special importance that all rays reaching a single screen element or ridge and thus constituting a given image component, be brought to a focus, when resolved as aspect elements, within a vertical strip of the sensitized surface no wider than the corresponding ridge or the like. In consequence where a camera is to be used and focused for views at a variety of distances and the position of the lens 94 relative to the image plane 95 must therefore be adjustable within a considerable range, provision should be made so that the relationship (II) is maintained at all times, or at least so that the width of any given image component $p'$ at the emulsion does not exceed a value equal to $$\frac{A_c F_r}{I_c}$$

A convenient mode of achieving this result is to provide a diaphragm for the lens comprising a pair of screens 104, 105, adjustable in position toward and away from each other so that the effective horizontal opening $A_c$ may be varied in proper relationship to the image distance $I_c$.

Turning now to Figs. 8 to 14 inclusive, one embodiment is shown of an improved camera particularly designed for taking relief pictures in accordance with principles herein explained. The illustrated structure comprises a base 110, an associated case or housing 111 (shown in phantom in Fig. 8), and a film holding case 112 connected to the open rear end of the case 111 by a suitable bellows 113. The present camera, it may be noted at outset, involves (in an improved manner) features and principles basically embraced by my prior Patent No. 2,063,985, granted December 15, 1936. The back 112 may be adapted to receive a film holder 114, e. g. of usual sort, in which a sensitized film, provided with the desired lenticulations or other resolving properties, may be inserted for exposure. A suitable shutter may also be provided, for example, of the focal plane type and controlled by appropriate means such as knob 115, the construction of the shutter being of known character and therefore not illustrated.

The camera back 112 is adapted to be moved forwardly and to the rear, i. e. for focusing adjustment, by virtue of sliding supports 117, 118 attached to it and displaceable by the actuation of a pinion 119 engaging a rack 120 on the support 117. A knob 121 is provided on the shaft 122 of the pinion 119 to turn the latter, for focusing, from the outside of the camera box. A lens assembly generally designated 123 is mounted in an appropriate opening in a vertical plate or lens board 125 carried by the base 110 within box 111. It will be understood that the exact optical design of the lens is not a feature of the present invention and therefore the specific lens elements cooperating to afford the usual achromatic, anastigmatic and other desirable characteristics are not shown. In most cases the assembly will comprise a front lens element or set of elements 126 and a rear element or set of elements 127 (see Fig. 10) respectively housed in cells 128 and 129. Certain diaphragm structure is also provided and although it may in some cases be positioned elsewhere relative to the lens or its elements, a particularly convenient arrangement is to mount such parts between the lens elements 126, 127.

Referring to Fig. 10, there is a fixed diaphragm 130 having a horizontally elongated, rectangular opening 131 representing the maximum effective aperture, in both horizontal and vertical directions, of the lens. On one side of the fixed diaphragm, e. g. at its rear, there is provided an exposure-controlling diaphragm generally designated 132 and comprising a pair of opaque screens 133, 134 vertically movable toward and away from each other, as by having their edges slidably supported in vertical guide slots or recesses 135, 136. The opposed horizontal edges 137, 138 of the diaphragm structure 132 thus define the vertical height of the lens opening and are adjustable to control the effective aperture (for change of exposure or of depth of focus or the like) to the same effect as the usual iris diaphragm of a camera.

To adjust the horizontal opening, i. e. the angle of divergence of rays through the lens, and thus to maintain the desired ratio of lens opening to image distance for proper coordination with the focal ratio of the resolving screen components, a diaphragm generally designated 138 is provided, for example ahead of the fixed diaphragm 130. The diaphragm 138 comprises a pair of opaque screens 139, 140 horizontally slidable, e. g. in supporting slots or recesses 141, 142 at their top and bottom edges, so that their inner vertical edges 143, 144 may be brought toward and away from each other to adjust the effective horizontal opening $A_c$ as explained in connection with Fig. 4, the members 139 and 140 thus corresponding to the elements 104, 105.

One convenient arrangement for actuating these diaphragm assemblies is shown in Figs. 12 to 14, where the several movable and stationary elements are identified by the same numbers as in Fig. 10. Fig. 12 shows the horizontally adjusted diaphragm 138, comprising the plates 139, 140, each of which in a marginal portion has an arcuate spirally extending slot 146 that is slidably traversed by a pin 148 projecting from a flat ring 149 rotatably held within the cylindrical housing 150 of the lens assembly. The ring 149 has a plurality of circumferentially arcuate slots 151 traversing corresponding studs 152 secured to the stationary guide plates 153, 154 which also have a suitable configuration to provide the guiding recesses 141, 142 for the screens 139, 140. The guide plates 153, 154 are fixedly secured in position within housing 150. A pair of operating arms 156, project from the ring 149 through appropriate circumferential slots 158 in the housing 150 and are attached to a ring gear 160 which is rotatably secured at the exterior of the housing 150. It will thus be seen that upon turning the ring gear 160 around the housing (with which it is coaxial) the ring 149 is correspondingly rotated, being guided by the studs 152 in the slots 151, and that upon such rotation of the ring a camming action of the studs 148 (of which only one is shown in Fig. 12) within the slots 146, moves the screens 139, 140 horizontally toward or away from each other in a horizontal direction.

Referring now to Fig. 13 which shows the arrangement of the diaphragm 132, it will be seen that the diaphragm screens 133, 134 have arcuate spiral slots 162 traversed by pins 163 projecting from a ring 164. The ring 164 is rotatably mounted inside the housing 150 and is connected for actuation by an external ring gear 165 in a manner identical with corresponding parts described in connection with Fig. 12 and therefore not here again specified. Accordingly, as the ring gear 165 is turned, the pins 163 cooperate with the slots 162 in camming relation to move the screens 133, 134 toward or away from each other. For further illustration, Fig. 14 is an exploded detail view showing the connection of an arm 156 projecting through a slot 158 in the lens housing 150 so as to actuate a ring gear 160 or 165, it being understood that the inner surface of the ring gear actually slides upon or in a groove upon surface of the cylinder 150.

Referring also to Figures 8 and 9 a pinion 167 meshing with the ring gear 160, is mounted on a shaft 168 carrying a bevel pinion 169 which in turn meshes with a bevel gear 170 on a shaft 171, the shafts being journalled in appropriate bearings supported by the base 110. The shaft 171 also carries a gear 172 disposed in mesh with the pinion 119, and the arrangement and train of gearing is such that as the knob 121 is operated to rack the film holder towards or away from the lens assembly, i. e. for focusing purposes, the horizontal opening screens are horizontally adjusted in position. As the back frame 112 is moved away from the lens the diaphragm 138 is opened to provide a larger effective horizontal aperture, and vice versa. In either case, the proportions and ratios of the several gears are designed, as will now be readily understood to maintain a constant ratio of $I_c$ to $A_c$, e. g. as expressed in Equation II.

For adjustment of the other diaphragm 132, a pinion 174 on a shaft 175 journalled in an appropriate support secured to the inner wall of the box 111 meshes with the ring gear 165. A pair of meshing bevel gears 176, 177, secured on the shaft 175 and on another shaft 178 respectively, permit rotation of pinion 174 by a knob 180 at the outside of the box 111, the knob 180 having a cooperating scale 181 as indicative of the extent of opening of the exposure-adjusting diaphragm 132. Although the box 111 may in some cases have a circular front opening, a horizontally elongated, rectangular opening 183 is provided for cooperation with the several diaphragm arrangements, while permitting all the desired light rays to reach the optical system.

It will now be seen that the described camera provides a satisfactory and easily adjusted apparatus for taking relief pictures, as by the method illustrated in Fig. 1. The structure is adaptable to lenses of large diameter, e. g., lenses having an effective horizontal diameter of the order of as much as 10″ or so, and the several focusing and diaphragm adjustments are very conveniently arranged. The horizontal opening control can be accurately proportioned to the positional relation between the lens and the image plane, adjustment of both in such proportion being automatically effected by the single knob 121.

While combined structures of resolving screen and photographically sensitized surface may be made in other ways, reference is here made to certain particularly suitable methods for embossing lenticulations on plane-surface film of the usual cellulosic composition, as disclosed in my prior Patents No. 2,218,227 granted October 15, 1940, and No. 2,296,804 granted September 22, 1942. The first of these provides an embossing procedure wherein the film is softened by heat, while the second embraces the use of a solvent in the embossing operation, e. g. a solvent such as acetone or other material appropriate to soften the cellulose acetate or other substance of which the film is made. It is at present preferred to use an improved apparatus for embossing film with lenticular ridges or the like, which is described and claimed in my copending application Ser. No. 771,220, filed August 29, 1947, for Apparatus for Lenticulating Film, and which embodies a solvent operation of the character generally disclosed in my second mentioned Patent No. 2,296,804.

As explained hereinabove a negative made with a camera of the sort indicated in Fig. 1 and more completely illustrated in Figs. 8 to 14 is of pseudoscopic character, the apparent relief being of a reversed sort (Fig. 3) as compared with the ordinarily desired reproduction of natural relief. As also explained, a truly stereoscopic picture, corresponding to a view of the object shown in Fig. 1, should have the characteristics indicated in Fig. 2, and a particularly important feature of the present invention is the provision of means and procedure for converting a pseudoscopic image or a picture into one of truly stereoscopic nature. In accordance with the presently preferred embodiment of such arrangements, a stereoscopic print is made by projection from a pseudoscopic negative, the specific method and apparatus having the further advantage that the projected print may have any desired size relationship to the original negative. For example it may be of the same size, i. e. by a one-to-one projection, or it may be enlarged or reduced.

A simplified system of this type is illustrated diagrammatically in Fig. 15, where the pseudoscopic negative is shown at 320, comprising a lenticulated film base 321 carrying the developed image 322. The negative 320 is disposed so that its lenticulated base 321 is illuminated, i. e. through the lenticulations 324, by a lamp 326. The thus illuminated picture 322 is projected by a lens 328 on a sensitized photographic surface 329 through an immediately adjacent lenticular screen or the like 330. It will be understood that the last mentioned elements may comprise a sheet of lenticulated film, e. g. as made in the manner identified above, wherein the sensitive surface 329 constitutes an emulsion coated on the plane side of the film base. The lenticulations 331 are disposed facing the lens 328 and in strictly parallel relationship with the lenticulations 324 of the negative 320. The distances between the negative, lens and printing film 332 are such that the lens 328 focuses an image of the object-picture 322 on the sensitive surface 329, having the desired size relationship to the negative.

The lamp 326 is advantageously of a sort providing a line of light 334, parallel to the lenticulations 324 of the negative. It may be explained that although an excessively thin line of light (having no appreciable breadth) might be theoretically preferred, excellent results in practical operation are obtained with an only moderately fine strip of illumination such as is obtained with certain gas discharge lamps now available to provide a long very narrow band or line of light. The chief requirement, in effect, is that all rays from a linear ribbon of light 334 which enter a given ridge of the negative screen 321 be essentially parallel so that they are focused by the ridge as practically a single line in the developed picture 322.

With the parts arranged substantially as shown in Fig. 15, the projection print is made by exposing the negative 332 to the illuminated image, while effecting relative motion, of a scanning character, between the negative 320 and the remaining parts of the system, viz., the lamp 326, lens 328 and printing film 332. While this relative motion may be achieved by keeping any one of the four parts stationary and appropriately moving the other three, a convenient arrangement is to hold the negative at rest and to effect a coordinated, synchronous displacement of the other elements. More specifically, with the parts arranged as shown in Fig. 15, the lamp 326 is moved upwardly and the lens 328 and film 332 are moved downwardly in proper coordination, i. e. so that the image on the receiving emulsion 329 is maintained at essentially the same place and of the same size during the scanning operation, and also so that as the lamp 326 moves up the successively illuminated lines behind each lenticulation 324 of the negative 320 are correspondingly focused, as images of such lines, in proper position within the component strips that are in effect defined on the emulsion 329 by the lenticulations 331.

Thus in effect, the receiving film 332, lens 328 and lamp 326 are preferably moved as if they were guided by a rigid bar or lever pivoted at the middle of the negative 320 (between its upper and lower edges), and as if the lens and receiving film were also independently pivoted to and slightly movable along the bar and also each guided in a straight vertical path, so as to maintain their desired parallelism with the negative 320 throughout the scanning operation. For such operation the lens 328 is preferably one having a flat field of focus over a relatively wide angle, although if the lens is imperfect in that respect or if the minute changes in distance between the lens 328 and the negative and receiving films during the cycle should be objectionable in other special cases (as for extremely short projections), the scanning process may include concurrent horizontal or angular displacement of the moving elements of the projection system, of a compensatory character.

Thus the printing operation is effected during the described scanning, wherein the parts move from the position shown in solid lines in Fig. 15 to displaced positions such as indicated in dotted lines at 332a, 328a and 326a. As a result of this operation, the image produced (as shown) in the emulsion 329 has been converted to a true stereoscopic character, and at the same time it will be a positive image where the object film 320 is a negative. By way of explanation, it will be seen that when the lamp 326 is in its first position, its rays striking the lenticulation 324a will be focused at the point (or line) A in the picture 322. Thus the aspect element A is the only such element that is illuminated, at this instant, among the plurality that make up the image component behind the lenticulation 324a. Rays from the illuminated band or line A are brought to a focus by the lens 328 on the corresponding lenticulation 331a of the film or screen 330 and thus are brought to a focus, as a corresponding aspect element A in the receiving emulsion 329. It will also be seen that when the lamp has been moved to the position 326a and the lens and receiving film are likewise moved to their terminal positions, rays from the lamp are now focused, by the ridge 324a, upon the aspect element C and an image of this aspect element is now focused correspondingly on the sensitive surface 329 as indicated. In the same way, during the intermediate positions of the lamp lens and receiving film intermediate aspect elements of the object film are illuminated and correspondingly brought to focus on the receiving film, and it will also be understood that simultaneously with such successive illumination of the aspect elements corresponding to the ridge 324a there is like illumination and projection of successive aspect elements behind each of the other ridges in the screen 321.

In consequence the sensitive film 329 is exposed to a complete image of the object-picture and it is important to note that whereas the aspect elements such as A, B and C were disposed in the object-picture in a reverse relation (as explained in connection with Fig. 3) they are projected on the receiving surface 329 in the desired order for true stereoscopic results, as illustrated in Fig. 2. That is to say, by the scanning projection illustrated in Fig. 15, the order of the aspect elements within each component of the picture has been reversed, so that now the element A, for instance, is nearest the blunt end of the arrow, while the element C is furthest from such end, within the component corresponding to a single lenticulation. Thus the resulting picture, when viewed through the screen 330, will be truly stereoscopic in that objects nearer to the observer in the original scene of Fig. 1, will appear nearer in the picture and remote objects will appear properly in the background. The reversal of order of the aspect elements occurs, of course, throughout the image, i. e., within each image component; but the order of image components themselves relative to the outline of the picture is properly retained. At the same time, the character of the photographic reproduction is reversed, as is usual in a projection or other printing process; i. e. the developed print on surface 329 will be a positive, where the object-picture is a negative.

It will be noted, however, that the image on the surface 329 in the arrangement of Fig. 15 is reversed, as a whole, relative to the original object of Fig. 1 or the desired reproduction in Fig. 2. Because of the reversal occurring by projection through the lens 328 and because of the disposition of the negative 320 with its emulsion side toward the lens, the actual picture on the surface 329 is thus a mirror image, e. g. reversed from side-to-side when viewed with the lenticulations vertical, of the original object as the latter would be seen by observers at 64, 65 in Fig. 1.

Accordingly in the arrangement of Fig. 16, provision is made for reversing the projection so that the final image produced by the scanning printer, is a true and correctly oriented reproduction of the original scene. In this arrangement the object picture, comprising a pseudoscopic negative 340 with its adjacent lenticular screen 341, is disposed in a horizontal position, the ridges 342 of the screen facing downwardly but parallel to the ridges 344 of the screen 345 of the receiving film 346. The sensitized surface 348 of the receiving film is disposed, as in Fig. 24, on the opposite side of its screen 345 from the projection lens 350. A plane mirror 351 is arranged at an appropriate angle, e. g., 45 degrees, so as to reflect light from the emulsion side 352 of the object-picture 340 toward the lens 350 throughout the range of displacement which the latter has as explained in connection with Fig. 15. It will now be understood that the optical projection system intermediate the surfaces 352 and 348 is arranged, and may be adjusted and focused, in the same manner as the corresponding system of Fig. 15 except that the mirror 351 reverses the image, in an overall sense, so that the reproduced picture on the receiving surface 348 will be a true representation rather than a mirror image of the originally photographed scene.

While the lamp 354, which provides a linear or near-linear band of illumination 355 may be moved horizontally beneath the object-picture 340—e. g. from right to left as the lens and receiving film move from an upper to a lower position—mechanical requirements in performing the method make it preferable, in many cases, to have a vertical motion of the lamp 354. Accordingly a further plane mirror 357 is provided, at a suitable angle, e. g. 45 degrees, below the object-picture 340, and the lamp 354 is then moved vertically through a path at the side of the mirror so that the latter reflects the illumination upon the under surface of the object-picture 340. As in Fig. 15 the motion of the lamp is such that its light-line is always parallel to the lenticulations of the screen 341.

In operation, there is thus provided a relative motion between the object-picture 40 and the remaining optical elements comprising the lamp 354, lens 350 and receiving film 356, and in the arrangement shown, the object-picture 340 is conveniently stationary and the other parts are arranged to move in a vertical direction. The positional movement of the elements is exactly the same as explained in connection with Fig. 15, i. e. governed by maintenance of the same optical relationships throughout the paths of movement, the only difference being to take into account the fact that the optical paths are twice bent at right angles by virtue of the mirrors 351 and 357. Thus as the lens and receiving film move down from their uppermost locations as shown at the top of Fig. 16 to the positions indicated at 346a, 350a, the lamp 354 is moved upwardly from its illustrated lowermost position to its upper limit 354a.

It will now be noted that the rays from the lamp are successively focused on different aspect elements in each image component of the object-picture (by the lenticulations 342) as the lamp travels upwardly; and the illuminated aspect elements are correspondingly projected and focused, in succession, on the receiving surface 348. It will be particularly noted that as explained in connection with Fig. 15, the order of aspect elements within each image component is reversed by this scanning procedure; inspection, in Fig. 16, of the relation between aspect elements A and C of the object-picture and corresponding elements of the reproduced picture on the surface 348 will readily indicate this reversal, particularly upon comparison with Figs. 3 and 2. At the same time the picture as a whole is properly projected and reproduced on the surface 348 and is reconstituted as a true reproduction of the original scene, with the several parts in proper order and relationship. Thus the arrangement of Fig. 16 provides a complete and effective system for converting a pseudoscopic picture to a stereoscopic view, and particularly for converting a pseudoscopic negative to a stereoscopic positive print which is a true representation of the original scene from which the negative was made, rather than a mirror image.

Whereas in the foregoing description of Figs. 15 and 16 it has been assumed that the lamp 326 or 354 is continuously illuminated during its scanning travel, and whereas useful results may be had by so operating the lamp, it is advantageous in many cases, to provide only an intermittent illumination. For example by appropriate contacting devices, the lamp may be energized for successive brief periods, spaced by periods of darkness, as it travels upward. The frequency of illumination and the duration of each period thereof are dependent, on the one hand, upon the need for such better definition and clarity of the projected picture as results from the intermittent illumination, and on the other hand, upon the intensity of the light, the speed of the sensitive surface upon which the picture is projected and the desirability of having as many separate aspect elements as possible in each component of the projected picture.

Thus in projecting pictures of an ordinary portrait size, and with lenticulations or the like (in the receiving screen) having a pitch of 250 or more to the inch, particularly good results are had by providing 30 to 50 flashes of the lamp 326 or 354 during its complete path of travel. Manifestly the theoretical effect of such intermittent illumination will be that the component behind each lenticulation in the receiving film will consist of minutely spaced lines of exposures, each line in effect constituting a separated aspect element. In practice, for instance with an illumination frequency of the character just stated the spatial separation of the individual aspect elements will be inconsequential (i. e. by reason of diffusion in the enlarging process), and yet at the same time there is avoided an undesirable confusion of aspect elements or an apparent defocusing tendency which the enlarging process may otherwise tend to exert, to the detriment of clarity and sharpness in the ultimate picture viewed through the resolving screen. The intermittent illumination of the lamp, which is preferably of a regular sort but need not ordinarily have any particular synchronization with the movement of the lamp or other scanning parts, also contributes to the elimination of interference or diffraction effects, e. g. such as produce so-called moiré patterns in some types of purportedly stereoscopic reproducing arrangements. On the other hand, the better the resolving screens at the object and receiving positions (i. e. the closer their lenticulations are to optical perfection), the more frequent the flashes may be, with good clarity and definition in the print.

As a matter of fact, an important feature of the scanning projection exemplified in Figs. 15 and 16 is that in all cases it is remarkably free of moiré patterns or other undesirable results of diffraction or interference, such as tend to occur where attempts are made to achieve a single, non-scanning projection of a lenticular film negative upon a corresponding receiving film with a large lens.

A further feature of systems such as shown in Figs. 15 and 16 is that they may also be used for reproduction of stereoscopic pictures from stereoscopic negatives or prototypes, e. g. simply by moving the lamp 326 or 354 in an opposite direction to that employed for effecting a relief conversion, or more specifically, for instance, by moving the lamp down while the projection lens and receiving film also move down, with the same (though thus reversed) proportionality of positional displacement. In other words the scanning projection system of the present invention may in its broader sense be used not only to project a truly stereoscopic print from a pseudoscopic prototype but may alternatively be used to make a stereoscopic copy of a stereoscopic prototype, or a pseudoscopic print of pseudoscopic picture, or indeed to make a pseudoscopic copy of a steresocopic original, it being understood that in the last mentioned situation the relative movements of the lamp and other optical parts are the same as for the first-mentioned type of conversion, i. e. pseudoscopic to stereoscopic.

Figs. 17 to 26, inclusive, illustrate, by way of example, a particularly advantageous embodiment of a scanning projector adapted to operate in accordance with the principles explained above. The machine comprises an elongated, horizontal table 401 supported by an appropriate framework 402 and carrying an optical bed or track 403 on which are fitted supporting base structures 404, 405 each adapted to slide along the track 403 and to be clamped in any desired position of adjustment, as by means of set screws 407 (Fig. 23). The base 404 carries a pair of spaced upright bars 408 upon which a lens board assembly 409 is guided to slide vertically, the assembly 409 being actually supported by a vertically movable rod 410 secured to a lower portion of the lens board and extending below the table 401 for reciprocating drive as hereinafter explained. The base 405 carries identical upright bars (not shown) arranged to guide a vertically sliding plate holder 414, the latter comprising a frame 415 and removable backing plate 416 which are adapted to hold, in vertical position and in a facing relation to the lens board 409, a lenticulated film 418 or other combination of resolving screen and photographically sensitive surface, upon which the picture is to be projected. The film or plate holder 414 is carried on a vertical rod 420 likewise extending below the table to the mechanism for moving it up and down. The lens board 409 mounts a suitable projection lens 421, and a lighttight bellows 422 of appropriately expansible character, extends from the lens assembly 409 to the film holder 414.

The framework 402 beneath the table 401 appropriately supports a reversible driving motor 424 which through worm gearing 425 and bevel gearing 426 drives a horizontal shaft 427 which in turn carries a bevel gear 428. The latter is disposed to mesh with a bevel gear 429 on a vertical shaft 430 journaled at a central position beneath the table. The shaft 430 is threaded throughout a substantial part of its length as indicated at 431 and traverses a correspondingly threaded collar 432 which is pivotally connected by a pin 434 to a long, rigid arm 435, the arm 435 being pivoted at one end 436, remote from the collar 432, to a fixed point, e. g. on a rigid supporting arm 437 depending from the table 401. The pin 434 actually traverses a slot 438 in the arm, to accommodate lateral displacement of the adjacent portion of the arm relative to the collar as the arm 435 swings about its pivot 436. Thus as the shaft 430 is turned by the described gearing, and depending upon the direction of rotation, the collar 432 will rise or fall, by the screw action of the shaft therein, and the arm 435 will be swung up or down, around its pivot 436.

The shaft or rod 410 is slidably guided by a bearing block 440 so that the shaft may reciprocate vertically but will not tilt, and will not move horizontally except by desired adjustment as hereinbelow explained. The lower end of the shaft, below the vertical bearing 440, is secured, at least against relative vertical motion, in a collar 442 which is pivoted to the arm 435 by a pin 443 traversing an elongated slot 444 in the arm. The shaft 420 is likewise guided for vertical displacement in a bearing block 446 conveniently identical with the bearing 440, and the lower end of the shaft 420 is similarly carried by a collar 448 pivoted to the arm 435 by a pin 449 traversing an elongated slot 450 in the arm. In consequence as the arm 435 is rocked up and down about its pivot 436 by the screw shaft 430, the rods 410 and 420 will be proportionately displaced in a vertical direction, and likewise the lens and film holding assemblies 409, 414 respectively carried by the rods.

At an end of the table on the opposite side of the lens 421 from the film holder 414, there is mounted a lamp and negative-holding housing generally designated 452. The housing 452 supports a plane mirror 453, mounted at an angle of 45 degrees to the vertical and exposed through an opening 454 toward the lens 421. A negative film holder 455 is disposed beneath the mirror, comprising a frame 456 and a transparent backing plate 457 (which may be omitted if the film or other prototype picture can be otherwise held in a sufficiently flat condition) adapted to retain the negative lenticulated film 460 with its screen side facing downwardly as shown in Fig. 18. The film 460 is thus disposed so that its illuminated emulsion side 461 is reflected, in effect, by the mirror 453 toward the lens 421. Beneath the film holder 455, there is disposed another plane mirror 462, likewise at an angle of 45 degrees and arranged to direct light from a horizontal direction upwardly toward the negative 460.

For illumination of the negative 460 according to the principles explained in connection with Figs. 15 and 16, a scanning lamp generally designated 465 is provided, to be operated and arranged as shown in Figs. 17, 22, 25 and 26. For drive from the motor 424 a horizontal shaft 466 carries a bevel gear 467 meshing with the gear 429 on the vertical shaft 430. At its opposite end the shaft 466 carries another bevel gear 467 in mesh with a bevel gear 468 on another vertical shaft 470 which is suitably journaled in the frame and table. At an upper part, above the table 401, the shaft 470 carries threads 471 which are engaged by corresponding similar threads in a vertical opening 472 of a supporting member 473 which is guided by rods 474 sliding through appropriate openings at the ends of the supporting member (Fig. 26). A lamp housing 475 having an elongated slit-like opening 476 is carried on a pair of rods 477 adjustably mounted in the supporting member 473, the housing 472 having a removable rear wall 478, so that access may be had to the lamp for replacement when necessary, and also for adjustment of the position of the lamp relative to the mirror 462, i. e. adjustment of its optical distance from the film 460.

In cooperation with its housing 475, the lamp 480 is designed to provide a long narrow source of light, preferably of the nature of a single line, which is projected to the mirror 462 and thence by reflection to the underside of the film 460, advantageously with no appreciable direct illumination of other parts of the apparatus and particularly without any passage of light rays from the lamp directly to the film rather than via the mirror. While other types of lamps may be used, e. g. embodying filaments or the like, a gaseous discharge lamp of the so-called flash phototube type, for example a krypton-containing lamp known as (G. E.) F. T.-22, has been found particularly satisfactory in affording an extremely intense illumination of the character described. Such a lamp is housed in an elongated glass envelope of tubular shape and for improved results the rear half of the tube, as at 481, may carry a coating of aluminum or other internally reflective material, while a coating of black, opaque material 482, may be applied over the forward half of the tube, except along a strip or band 483 corresponding to the opening 476 of the housing. The last mentioned opening, preferably embodied in a relatively thick front wall 484 of the housing, may have inwardly sloping edges as shown to cooperate with the clear strip 483 of the lamp itself for collimation of the rays in a manner indicated by the dotted lines 486 of Fig. 17, i. e. to cut off direct rays outside the upper and lower limits shown.

By virtue of the described gearing and the vertical shaft threaded through the opening 472, the lamp assembly 465 is moved up and down as the shaft 466 turns, and thus in synchronism with the lens holder 409 and receiving film holder 414.

As explained above, the lamp is preferably illuminated at intermittent intervals, and by way of illustrative example of means to that end, the shaft 471 carries a contacting device generally designated 490. The device 490 may consist of a wheel 491 having a plurality of regularly spaced, short, conductive segments 492, separated by relatively long insulating portions 493. The conductive segments 492 are electrically connected to the shaft 470 so that a pair of brushes 494 and 495 respectively bearing on the wheel and shaft and connected in series with the lamp 480 through conductors 496 and 497, will complete a circuit through the lamp each time the brush 494 engages a conductive segment 492. Although it will be understood that a flash phototube of the specific type mentioned above has means including a trigger coil which is preferably pulsed (to fire the tube momentarily, across a continuously-connected high voltage supply) by a thyratron trigger circuit that is adapted to yield a single rapid pulse for each closure of the contacts 492—494, Fig. 26 shows (for simplicity of illustration) a very simplified trigger or firing circuit, suitable for certain forms of gas discharge lamps. For example, such circuit may comprise a battery 498 connected in series with a relatively high adjustable resistance 499 and a relatively large variable condenser 500, the lamp circuit having its terminals which consist of the brush 494 and the conductor 497, connected across the condenser 500.

It will be appreciated that when the brush 494 is on a non-conducting segment 493 the condenser 500 is more or less slowly charged to the voltage of the battery 498 through the resistor 499. As soon as the brush 494 engages a conductive segment, the condenser discharges through the lamp, having initially a voltage well above the required break-down or firing potential. After a very brief interval the charge of the condenser 500 is dissipated and since the voltage across the lamp will then, by reason of the high resistance 499, drop below the value required to maintain the discharge, the lamp will be extinguished. Preferably, the brush 494 then passes beyond the conductive segment to another insulating portion before the condenser 500 can be recharged from the battery through the resistor 499. As the brush then travels across the succeeding insulating segment, the condenser is recharged and the described cycle is thereafter repeated. In this manner brief, highly intense flashes of the lamp—e. g. of the order of one ten-thousandth of a second—are obtained at intermittent intervals throughout the period of its vertical travel in the described mechanism.

With the machine elements connected as shown in Fig. 17, the arrangement is intended to be such that the lamp assembly 465 travels upward at the same time that the projecting lens support 409 and receiving film holder 414 travel downward, all in the desired synchronism and proportionality relative to the negative 460 as explained in connection with Figs. 15 and 16. As likewise explained above, this method of operation provides for an inversion of relief in the projected picture, for instance so that a truly stereoscopic image may be obtained from a pseudoscopic negative. At the same time the projection system is also adapted for making prints without change of relief, e. g. stereo to stereo, simply by driving the lamp in the reverse direction.

To provide such reversal of lamp drive, the shaft 466 carries a spur gear 502 meshing with a like spur gear 503 on an idler shaft 504 which also carries a bevel gear 505 engageable with but ordinarily separated from a bevel gear 506 on the shaft 470. The bevel gears 506 and 468 may in fact be connected together and arranged to slide vertically on the shaft 470,, e. g. along the key or spline 508. Normally the two gears are positioned as shown in Fig. 17, i. e. resting by gravity on a collar 509 carried at a lower part of the shaft so that the gear 468 meshes with the gear 467 and the gears 506, 505 are out of mesh. To reverse the drive of the shaft 470 the bevel gear assembly 468–506 is simply pushed upward, as shown in Fig. 22, until the gears 506 and 505 are in mesh and the gear 468 is separated from the gear 467, the parts being held in such position by a suitable pin 509' removably fitted in a hole through the shaft 470.

For optimum alignment and proportionality of the motions of the lens board 409 and film holder 414 relative to the negative film 460, the axis of the pivot 436 for the transverse operating arm 435 is placed in vertical alignment with the effective optical plane of the negative relative to the projection system. Thus it will be understood that the mirror 453 reflects light from the negative toward the lens 421 just as if the mirror were absent and as if the negative were in a predetermined vertical plane 510 which is spaced back of the mirror in the same manner and extent as the film is actually spaced below the latter, such reference to the plane of the film being here intended to mean, more precisely, the emulsion side 461 thereof. In consequence, the axis of the pivot 436 is horizontally disposed within this plane 510, i. e. as the plane extends below the table 401.

The supporting structures 404, 405 through which the rods 410 and 420 slide have been described as capable of displacement along the optical bed 403. To provide actual corresponding adjustment of the rods 410, 420 themselves, as well as to facilitate the necessary concomitant displacement of the supporting structures 404, 405 (when their set screws 407 are loosened), appropriate mechanism is included, e. g. to be actuated by hand wheels 512, 513 at the side of the table 401 (Figs. 17, 20 and 23). Each of the vertical guides 440, 446 carries a horizontally extending portion 515 having a horizontal passage threaded on a corresponding adjusting rod which may be turned, through appropriate bevel gearing, by one of the hand wheels. Specifically, the wheel 512 actuates the rod 517 through the gearing 518 and the wheel 513 actuates the rod 519 through the gearing 520. In consequence, when the set screws 407 are loosened, the corresponding hand wheel may be turned to move the vertical rod 410 or 420 and all associated parts in a horizontal direction along the optical bed 403, the slots 444 and 450 permitting such adjustment of the supporting pieces 442, 448 relative to the arm 435. If desired, a further bellows 522 may be provided between the lens board 409 and the opening 454 of the negative-illuminated housing;

but in many cases such supplemental bellows is unnecessary.

For control of exposure and also, if necessary, to obtain optimum definition of the successively projected aspect elements in each component of the receiving film, the lens 421 may have an adjustable diaphragm, for instance, comprising a pair of horizontal, opaque screens 524, 525 as diagrammatically shown in Fig. 24, between the elements 526, 527 of the lens. The screens 524, 525 are respectively carried on upright members 528, 529, each channeled to provide a guide for the other shutter and each carrying an inwardly facing rack 530 or 531 at its upper end. The racks are simultaneously engaged by a pinion 532 which can be turned by knob 534 at the outside of the lens board. In consequence, adjustment of the knob 534 moves each of the racks relative to the other so as to widen or to close down the vertical width of the rectangular opening between the shutters. This arrangement, shown best in Figs. 17, 23 and 24, permits adjustment of the exposure and particularly, where the opening is parallel with the ridges of the negative and receiving films, permits restriction of the effective vertical aperture of the lens to a value affording best definition of the aspect elements, consonant with the transmission of an amount of light reasonably sufficient for exposure of the receiving film. If necessary for proper exposure, however, and if the apparatus is built with suitable precision, a given printing operation may sometimes involve more than a single, one-way traverse of the scanning parts, e. g. by including also a reverse stroke, or several strokes back and forth, or a succession of strokes in the same direction effected by darkening the lamp during the return sweeps.

It will now be appreciated that the apparatus illustrated in Figs. 17 to 26 inclusive is particularly designed to carry out the procedure shown in Fig. 16, and automatically provides for the desired relative motion of optical elements, and the desired intermittent illumination of the lamp 480, with the necessary proportionality and synchronism. Furthermore, by appropriate adjustment of the hand wheels 512, 513 the lens 421 and the film holder 414 may be moved to achieve any desired size relationship, either enlarged, 1 to 1, or reduced, between the projected image and the negative film 460, and also to obtain or maintain a desired condition of focus in the vertically reciprocable projection system comprising the lens and receiving film. It should be particularly pointed out that the number and size of the lenticulations 418 or other screen elements for the receiving film need not equal those associated in or with the negative film, but may be primarily chosen with regard to the use to which the ultimate projected picture is to be put. It will be understood, however, that in order to avoid overlapping of aspect elements behind the ridges or other subdivisions of the screen 418, the ratio of their individual width to the thickness of the screen (or their distance from the sensitive emulsion in the receiving film) should not be less than the the ratio $A_c:I_c$, where $I_c$ is the distance between the lens 421 and the receiving film, and $A_c$ is the distance of vertical travel of the lens 421 in the scanning operation, e. g. as measured between upper and lower limits respectively reached by the upper and lower edges of the actual lens opening in use. Preferably, the proportion of the ridges should equal or nearly equal this ratio, if the emulsion area of the receiving film is to be fully utilized, i. e. if the aspect elements for each image component are to fill up the space allotted to them behind the corresponding ridge or other screen portion. Thus if the requirements of proportionality are observed, the screen embodied with the receiving surface may have any desired number of lines or resolving elements of any desired individual width, it being remembered that for best viewing results in the ultimate picture, suitable account should be taken of the relationships described in connection with Figs. 1 to 6, e. g. as related to the original observation of the scene, and as to the use of resolving screen elements finer than the resolving limit of the viewer's eye. For such determinations the "effective horizontal opening" of the lens, $A_c$, is taken as its complete distance of travel, measured outside-to-outside as explained above. Under these circumstances the illustrated apparatus yields remarkably satisfactory pictures of truly stereoscopic nature, which may be made from pseudoscopic negatives and may take the form of either positive transparencies or positive, opaque prints.

In the described arrangement of the lamp housing 475 and its slot 476 and the described relation of these parts to the mirror 462 and the film 460, the total or over-all area illuminated from beginning to end of lamp travel by the rays from the lamp in the horizontal plane of the film 460 should ordinarily equal but need not ordinarily exceed the width of the film (in the plane of Fig. 17) plus the distance through which the lamp travels in a vertical direction. In consequence, the disposition of the parts should be such as to permit this extent of illumination while always keeping the entire film in the illuminated region and while preventing any appreciable passage of rays from the lamp to the film otherwise than by the intended reflection in the mirror 462. For instance the film support may extend substantially beyond the film at each side as shown, to provide opaque regions at least co-extensive with the maximum overlap that the illuminated area may have at the respective ends of its course of travel. In addition the entire interior of the housing 452 is preferably blackened, or otherwise constructed for a minimum of incidental reflection, to promote clarity in the projected stereoscopic image.

If in some cases the lens tends to form a defocussed but objectionable image of the lamp itself on the receiving film, a multiple condensing or collimating device can be placed near the object film, between the latter and the lamp. A presently preferred arrangement in accordance with this further feature of the invention comprises a sheet of plastic having lenticular ridges on both sides and disposed close to the lenticulated or other screen side of the object film, the major plane of the sheet being parallel to the latter. For instance, where the object film carries 300 lenticulations per inch, the multiple condenser may be a sheet of transparent plastic 0.02 inch thick and carrying 100 contiguous, lenticular ridges per inch on each side, the curvature of the ridges being designed (e. g. according to Equation IV hereinabove) so that each has its principal focus half-way through the sheet. The ridges on one side should be parallel to those on the other side, but ordinarily need not be aligned in direct or any other particular style of opposition. Rays from the lamp striking a given ridge may be considered essentially parallel and are focussed at a central plane in the sheet; since they are then concentrated in a line which is also at the focus of a ridge (or a pair of adjacent ridges) on the opposite side, they emerge from the latter as parallel rays having practically the same direction as that of their original incidence. The same phenomena occur, in correspondingly different directions, at all other regions of the condensing sheet, and in this way the illumination of the object film is obtained with the desired directional character for every position of the lamp (i e. with the rays properly collimated), while any tendency of the lens to image the lamp itself toward a single locality of the receiving film is effectively reduced.

According to present understanding, best results (in avoiding moiré patterns or other objectional effects) are obtained with the multiple condensing and collimating screen spaced close to, but not quite in contact with, the lamp-facing, i. e. lenticulated side of the object film, e. g. spaced by about one eighth inch or slightly more (the plate 457 being omitted or made correspondingly thin), the ridges of the sheet being preferably coarser than the resolving elements of the screen of the object film, in a proportion measured by a simple, whole number ratio. The condensing screen is advantageously disposed with its ridges precisely parallel with those of the screen in the object film.

Another method which may be practiced with the described machine for making a stereoscopic print (opaque or transparent, positive or negative) from a stereoscopic object picture, or a pseudoscopic print from a pseudoscopic object, is to insert the object picture at the object position, i. e. in the holder 455, with its lenticular or other screen uppermost, i. e. facing the lens 421. The projection system, comprising the lens and the receiving film 418 are then moved through the scanning path, and function to project successive sets of aspect elements (each set comprising, in effect, one such element from each image component of the object picture) upon the receiving surface. Although all elements of each component may be more or less simultaneously illuminated, the screen on the object picture serves to separate and spread out (at divergent angles) the aspect elements of each component so that only one, in effect, is received by the lens at any instant, the whole number of aspect elements reaching and projected by the lens at any instant being thus equal to the number of image components. At the receiving film, the successive elements are thus received at successively different angles as the system scans, and are correspondingly allocated on the sensitized surface by the receiving film in exactly the same order as their origin in the object picture. In this type of operation the vertical lens opening, between the screens 524, 525, is preferably made as small as possible, e. g. like a narrow horizontal line (a condition also preferable, although perhaps not so strongly preferable, in the first mentioned type of process, illustrated in Figs. 15 and 16); and although here the direction of movement of the lamp may be theoretically of no significance—in that it could go either way, or be stationary—it is advantageous to have it moving in the opposite direction to the projection system and thus in the same way as for a projection (of Fig. 16) which is used to reverse the relief effect. When the lamp is so moved (and operated intermittently, for the same reasons as described above), it has a maximum illuminating effect at any instant in the direction corresponding to the aspect elements then being reviewed by the lens, and thus cooperates, by its relatively less illumination of other elements, in the selective rejection of the latter at each instant.

In projection of the type last described, using the mirror 453 (as distinguished from an organization resembling Fig. 15 in the omission of such mirror), the received picture will be disposed, as a whole, exactly like the original and will not be reversed. It may, of course, be enlarged or reduced, affording a great advantage for this process over any attempt at contact printing. By omitting the mirror, (i. e. using a projection system like that of Fig. 15, but with the ridges of the film facing the lens), reversal of image may be obtained if necessary. It will here also be noted that when printing stereo to stereo or pseudo to pseudo with the method described previously above (and with the use of the mirror 453), i. e. with the lenticulations of the object picture facing the lamp and the lamp driven in the same direction as the lens and receiving film, there is a reversal of the image in that as viewed through its screen the projected print is a mirror image when compared to a view of the object picture through its own screen.

The present invention is of particular value in making imprinted reproductions of stereoscopic or other relief pictures, e. g. by a process of the printing press type whereby any number of identical copies can be produced by means employing printing surfaces and ink rather than photographic reproduction. Although various methods may be followed, Figs. 27 to 29 inclusive illustrate one procedure for making a cylindrical printing surface to be used, in accordance with further features of the invention as shown in Figs. 30 to 32, for printing operations with a rotary press. The illustrated procedure is specifically adapted to what is called the photogelatin or collotype process, wherein a sensitive gelatin plate is exposed in accordance with the desired image and the resulting variations in the gelatin plate are appropriately developed or set so as to provide a surface having ink receiving and releasing characteristics capable of reproducing the image in a press of suitable character. The nature of the gelatin plate process is well understood and details are therefore omitted here, except as modified in accordance with the practice of the present invention.

If it is assumed that a plate is to be made from a given pseudoscopic negative, e. g. as taken with the camera shown in Figs. 8 to 14, the first step is to make a positive stereoscopic transparency, for example with the machine of Fig. 17, on a film embodying the desired resolving screen, e. g. a lenticulated film. The next step is to make from this stereoscopic transparency a stereoscopic negative, again for example with apparatus of the sort shown in Fig. 17, wherein the lamp is moved in the same direction as the projection system (as also explained above). Although this projection may be made upon a lenticulated film of the type previously described and having the sensitive emulsion applied thereto, it is presently preferred that the film and screen be separable and specifically that the screen be a separate transparent film of suitable plastic composition with its resolving elements exactly matching certain portions of the printing press as explained hereinbelow. In this manner any slight changes in shape or size of the lenticulations, which might ensue in the developing process, are avoided, with consequent avoidance of detriment to the necessary match between the resolving screen and the imprinted stereograph in the ultimate printed picture.

Thus as shown in Fig. 28 a thin film 550 having a sensitive surface 551, i. e. the usual sensitized emulsion, is faced with a transparent lenticular screen 552 which may be impermanently adhered to the emulsion side of the film, e. g. as shown in Fig. 27, or to the opposite side of the film if the screen is designed to take the additional thickness (of the film base) into account for its proper lenticular focus. The resulting composite assembly is then employed as the receiving film in the scanning printer such as shown in Fig. 17, and a stereoscopic negative image is projected on the emulsion 551, for example from a stereoscopic positive prepared as described above. After development of the image, the composite assembly is then wrapped around a cylinder or roller 554 (Fig. 29) which carries a layer or sheet of sensitive gelatin 555, the assembly 550—552 being disposed against the outer surface of the gelatin with the film itself next to the latter and with the screen lenticulations exactly perpendicular to the axis of the cylinder.

Thereupon the wrapped cylinder is appropriately exposed to diffuse illumination, for example by rotating the cylinder past a long lamp 556, so that all portions of the negative on the surface 551 are uniformly subjected to illumination and the underlying gelatin 555 is therefore exposed in the desired conformity with the light and dark portions of the negative. While the lenticular screen 552 may in some cases be removed from the film 550 for this printing operation, alignment of the negative with the cylinder, in that the lines of the aspect elements should be perpendicular of the axis, is facilitated by leaving the screen in place. Thereupon, the assembly 550—552 is removed and the cylindrical gelatin body 555 is subjected to the usual procedure to convert it into a suitable printing plate according to the process mentioned above. At the same time, the screen 552 can be separated from the negative film, for like use again in making other plates.

Fig. 30 shows diagrammatically a printing press embodying features of the present invention, particularly for effecting lenticulation and printed reproduction upon a desired surface by an operation which is simultaneous in time or at least in positional effect. Supposing, for instance, that the eventual printed pictures are to resemble sheets of paper or the like, but of opaque character and intended to carry the stereoscopic images for eventual viewing in the manner of any ordinary printed illustration, the imprint may be effected on a sheet of appropriate transparent material which is appropriately backed, in the same machine, to impart the desired opacity. Thus in Fig. 30 a continuous web or sheet 560 of cellulose acetate or other thin transparent plastic material is delivered from a supply roll 561 to a counterroll 562 and from the counterroll passes around a contiguous embossing roll 564 and (while still in contact with the latter) into engagement with the surface of the printing roller 554, the sheet then leaving both the rolls 564 and 554.

The arrangement of the counter- and embossing rollers 562, 564 may be generally similar to that shown in my cited Patent No. 2,296,804 and especially that of my cited co-pending application, including a contiguous belt or the like of absorbent fabric 566 carried around guide rolls 567, 568 and passing around the surface of the roll 562 beneath the film 560 and thence around at least a substantial part of the surface of the roller 564 outside of the film. Solvent for softening the film, e. g. acetone or the like, is delivered to the surface of the embossing roll 564 through a suitable pervious spreading roller 570 from a supply tank 571. The embossing cylinder 564 may be of a nature identical with those shown in my last cited patent and application, i. e. comprising a matrix or die which when pressed against the softened film surface, embosses thereon the desired lenticulations extending in a lengthwise direction. By the time the film reaches the further side of the embossing roll, the lenticulations are well set and here the printing roller 554 engages the opposite surface of the film or sheet with suitable pressure, to imprint thereon the desired impression of the plate 555. The printing roller 554 may be inked by appropriate roller or other means generally designated 574, in accordance with known practice for printing of the selected character.

Thus as the film 560 is delivered beyond the printing and imposing rollers, e. g. at 560a, it carries lenticulations on one side and on the other side a printed image of the desired stereoscopic picture. At a further roller 576 the printed face of the film or sheet is permanently backed with an opaque sheet 577 supplied continuously from a roller 578 and coated with suitable adhesive from a supply means 580. By virtue of a counterroller 581 the backing sheet is thus adhered to the printed face of the film 560, and as the finished composite strip is delivered at 560b it carries successive impressions of the stereoscopic picture, properly associated with embossed lenticular ridges for viewing each impression through the transparent body to attain the desired stereoscopic effect.

The entire process is automatic and the simultaneous nature of the lenticulating and printing operations insures desired coordination of the imprinted image with the resolving elements. In most cases, the only requirements in this respect are that the lenticulations produced by the embossing roller be equal in dimensions to those through which the prototype negative for the printing plate 555 was made, and that they be accurately parallel to the image components and aspect elements of the impression produced by the printing plate 555, as in the manner resulting from corresponding alignment of the working surfaces of both the rollers 554 and 564 in reasonably exact perpendicularity to their parallel axes. It will usually not be necessary for the image components to be exactly aligned in a lateral sense, with the lenticulations; a properly viewable stereoscopic picture will be obtained (if the original taking lens had a width of about two or more pupillary distances) even when the lenticulations are staggered in a half-and-half relation to the image components as originally allocated in the image, providing, of course, that true parallelism and dimensional relationships are maintained as described above.

Fig. 31 diagrammatically illustrates another type of press wherein the lenticular screen is produced by the use of heat in the embossing procedure, for example, as disclosed in my Patent No. 2,218,227, granted October 15, 1940. In the arrangement shown, the continuous sheet 601 of transparent plastic such as cellulose acetate or the like passes over a heated counterroll 602 and then around the matrix or embossing cylinder 603 against which the counterroller 602 forces the sheet in pressure contact, and on a remote side of the embossing roller 603 the opposite surface of the sheet 601 engages the printing surface of a printing cylinder 604 under appropriate pressure for receiving the printed impression. The printing roller is inked in the usual manner as by the inking rollers 605 and carries a cylindrical printing plate, for example prepared as described in connection with Figs. 27 to 29 inclusive. Although the transparent sheet 601 may be backed with paper as indicated at 557 in Fig. 30, an alternative procedure is here shown, for example in that the sheet passes over a coating roller 607 which applies to the rear face of the sheet, over the printed impression, a coating of opaque material, preferably a white ink or other light colored composition such as may be spread on the roller 607 by supplementary rollers 608.

The finished web or sheet is delivered at 601a, and comprises a series of impressions of the stereoscopic picture, combined with a film or screen having appropriate lenticulations, automatically disposed in exact parallelism with the components of the printed image. Being backed with an opaque layer, the resulting structure resembles (as does the product of Fig. 30) an ordinary picture printed on paper, cardboard or the like, but is characterized by a truly stereoscopic nature. It will be understood that in the arrangement of Fig. 30 an opaque rear coating may be used instead of the paper backing; and of course in other instances where the resulting picture is to be viewed as a transparency and where the printing ink employed is of appropriately transparent or translucent character, no backing at all need be applied.

Heating fluid is supplied to the counterroller 602 through appropriate inlet and outlet conduits 610, 611, while the embossing cylinder 603 is preferably cooled by a suitable cooling medium circulated into and out of it through the conduits 612, 613, the arrangement and function of the respective heating and cooling means being, for example, such as are described in my last above cited patent and therefore not explained in further detail here.

By way of further illustration Fig. 33 shows the simultaneous lenticulating and printing operation of Figs. 30 and 31, wherein the embossing cylinder 564 or 603 engages one side of the plastic sheet 560 or 601, which is in turn engaged, under pressure between the rollers, by the cylindrical printing plate on the printing roller 554 or 604.

It will be apparent that the described procedure is readily adapted for color printing, for example, in that printing plates for various constituent colors may be made in accordance with the system of Figs. 27 to 29, using appropriate color filters for the exposure of successive gelatin plates from an appropriate multi-color negative, or by making separate negatives corresponding to the constituent colors and then using each, with the same lenticulated screen 552, to make a corresponding plate. While the procedures of Figs. 30 and 31 may be readily adapted to printing several colors, for example by passing the sheet over successive printing cylinders beyond the first, Fig. 32 illustrates another advantageous color printing system. Here the continuous web of transparent sheet material 620 passes around a counterroller 621, then from it around an embossing roller 622 having a solvent-applying and distributing means 623, and thence over a further counterroller 625 which is pressed against a large countercylinder 626 for the printing operation. The counterroller 621 presses the film or sheet against the embossing cylinder 622 as explained hereinabove, there being also provided an endless loop or web of absorbent backing material 627 which carries the transparent sheet around the embossing cylinder 622.

A plurality of printing cylinders 630 to 634 inclusive are disposed around the periphery of the countercylinder 626, in spaced relation and engaging the outer or rear surface of the embossed film 620 as the latter is carried around the large cylinder. In accordance with practice known in the art of color printing on presses having multiple printing cylinders engaging a single counterroller, each of the printing cylinders carries a plate to provide the desired impression for one of the constituent colors and has appropriate inking means for such color. Likewise, the several printing cylinders are arranged for appropriate registration with respect to each other, and may therefore with like facility be arranged for the desired parallelism of their imprinted images, i. e. as to the image components thereof, with the lenticular ridges applied to the film by the embossing cylinder 622.

From the printing cylinder 626 the film 620a passes through a heating tunnel 636 to dry the ink, and is delivered for collection and use at 620b, it being understood that if desired, appropriate means (not here shown) may be provided for backing the film with opaque material, for example as illustrated in Fig. 30 or Fig. 31. By virtue of the positional simultaneity of the embossing and printing operations in the machine of Fig. 32, proper parallelism of the lenticulations and the imprinted image is accurately and automatically maintained, and the finished, printed product is again a truly stereoscopic picture, having the convenience, physical characteristics, and economy of manufacture usually attributed to ordinary printed illustrations of good quality.

Whereas for many purposes it is preferred that the resolving screen used in all stages of the procedure described herein, i. e. from the step of exposing a negative in the camera, to the final steps of making a projection print or the ultimate step of reproducing the picture in imprinted form, be of the transparent, lenticulated type other screens may be employed at one or more stages of the process. For example, in accordance with a further feature of the invention, Fig. 34 illustrates the nature and use of a screen embodying narrow ruled openings through an opaque surface. As there shown, a photographic film base 701 having on one side a coating or layer of sensitive emulsion 702 has its opposite face printed or otherwise marked with parallel opaque bands 703 spaced to provide narrow transparent lines or strips 704, extending vertically across the film.

When used in a camera of the sort shown in Fig. 1, rays traversing the horizontal rectangular aperture 706 of the large lens 707 can only reach the emulsion 702 through the clear lines or strips 704. As explained hereinbelow, the strips 704 are designed to have a focusing or image-forming function (and are thus, like lenticular ridges, properly called focusing elements), so that, for instance, rays of light 708, 709 representing different aspect elements of a given component of the scene, reach the emulsion 702 at separated localities 708a, 709a behind the transparent line 704a. It will readily be appreciated that the result is similar to that achieved with the lenticulated film, in that the complete image on the sensitized surface is divided into components, each corresponding to a line 704 and each subdivided into aspect elements corresponding to rays traversing various points across the effective lens opening 706.

Whereas there have been prior proposals to make relief pictures with gratings of opaque and transparent bands, it has now been found that peculiarly successful results are obtained by following a special design and correlation of the screen. More specifically, by adopting such design and correlation pictures of remarkably sharp definition are obtained, without revealing the lines or the linear division to the person viewing the picture, a practical result not heretofore obtainable, so far as I know, with a grating type of screen.

If $w$ is the width of each opaque band 703, $x$ the width of each transparent strip or line 704 and $y$ the thickness of the film base 701, it is found that the following relationship should be followed in the design of the grating:

$$x = \sqrt{ky} \qquad (V)$$

where $k$ is a constant, or rather a constant distance which in general circumstances should equal about 0.000064 inch (or $6.4 \times 10^{-5}$ inches)

At the same time where the actual opening or width of the effective lens portion 706 is $A_c$ and the actual distance between the lens and the film is $I_c$ (as noted hereinabove in connection with Figs. 4 and 5), the following optimum relationship should also be employed:

$$\frac{w+x}{y} = \frac{A_c}{I_c} \qquad (VI)$$

The significance of this last-mentioned equation will be readily apparent from Equation II and from what was said in connection with Figs. 4 and 5, it being nevertheless understood that whereas the film may be designed for an average specific image distance $I_c$, in practical operation the camera is adjusted to maintain the stated ratio $A_c:I_c$, i. e. by changing the value of $A_c$ in automatic correspondance with changes of $I_c$. Furthermore, the determination of an optimum value for this ratio may likewise be achieved in accordance with the desiderata of ultimate viewing distance and size of the picture, as also indicated hereinabove.

It will be seen at once that the Equations V and VI serve to define the dimensions of the opaque and transparent portions of the screen under any given circumstances, e. g. for a film base of any given thickness. Furthermore, computation shows that by using the stated value of the constant $k$, under ordinary circumstances of film thickness, the dimensions of the screen are such that the individual opaque bands 703 are narrower than the resolving power of the human eye for ordinary viewing distances. It has been stated that where the picture is to be viewed at a distance of 16 to 18 inches, the upper limit for non-resolution is about 1/200 of an inch. Using Equations V and VI, for a film thickness of .0083 inch and an aperture-to-image distance ratio of 1 to 2.5, the preferred width of the opaque bands is about .0024 inch, i. e. representing a grating of more than 300 lines (or resolving elements) to the inch. It will now be appreciated that the focusing effect of the screen is essentially like that of a pinhole camera, and following the proportions explained above, the aspect elements are resolved on the sensitive emulsion with a desirable sharpness of focus.

It may be noted that with screens of either the lenticular or transparent line type, the focus of the screen element is preferably such that each aspect element of the picture (e. g. each image, separately considered, of a point in the original scene) should have not more than a determinable diameter of confusion in a horizontal direction, i. e. should cover an area in or on the emulsion having a determinable maximum width which may be so denominated. Since the image of a point in a pinhole camera is, within reasonable limits, approximately comparable in size with the pinhole, at a considerable number of planes, the presently preferred maximum diameter of confusion for either type of screen may be determined as if at the preferred locality spaced inside the emusion from the interface by one third of the thickness of the emulsion, and may be determined by the Equation V above.

Experience has indicated that where light conditions permit, a screen of the character just described affords remarkably good results for taking the original picture, i. e. for making the original pseudoscopic negative in the camera, the depth of focus and clarity of definition being often better than can be obtained with lenticular screens of corresponding fineness. With this opaque band screen, substantially more exposure is usually needed, e. g. of the order of 4.7 times as much in comparison with the use of a transparent lenticular screen; but for many photographic purposes modern high speed emulsions will permit the taking of very satisfactory pictures with the screen of Fig. 34 without sacrificing depth of focus or shutter speed or the like. It will be understood, of course, that the illustration of the film in Fig. 34 is tremendously and disproportionately enlarged, for better diagrammatic illustration.

Figs. 35 and 36 show respectively further types of screens, each embodying an opaque coating 715 on the film base 701, such coating being provided with spaced, separated, small openings of any variety of suitable shapes, such as the square openings 716 in Fig. 35 or the circular openings 717 of Fig. 36. Preferably the openings are arranged in successive vertical columns, but staggered or alternated in position relative to each other, so as thereby to reduce the possibility of unwanted overlap between adjacent image openings in the emulsion 702. The design of screens such as shown in Figs. 35 and 36 may conveniently follow the rules explained above in connection with Fig. 34, relating the value of an opening side $x'$ and the distance $w'$ between columns of Fig. 35, or the diameter $x''$ of a pin-hole and the distance $w''$ between columns in Fig. 36, to the film thickness $y$ and other factors, in the same manner as the corresponding values $x$ and $w$ of Fig. 34.

The arrangements of Figs. 35 and 36 will usually require somewhat more exposure than those of Fig. 34, and thus may be somewhat limited in their application although they are each adapted to provide a remarkably satisfactory focusing and resolution of the image components and aspect elements thereof upon the sensitive surface 702. Indeed where the taking lens of the camera is adapted to project a plurality of aspects in more than one direction, for example where its effective opening is shaped like an upright, rectangular cross (not shown), the resulting negative image will have relief characteristics when viewed in different positions, e. g. on its side as well as in the normal vertical relation.

Although screens of the illustrated type particularly such as shown in Fig. 34 may be substituted for transparent lenticular screens in other stages of the procedures herein disclosed, e. g. for positive photographic prints of either transparent or opaque character, or even for imprinted pictures, as by substituting a grating-printing cylinder for the embossing rolls of Figs. 30, 31 and 32, it is at present usually preferred to employ a lenticular screen where the ultimate photographic or printed picture is to be viewed under ordinary circumstances. For such observation, much better illumination is usually obtained with the lenticular screen; but where an extremely strong light is available for viewing the final picture, screens of the illustrated grating type can be quite satisfactory.

In using a scanning projection procedure as shown in Figs. 15–17, negatives embodying the improved grating type of screen may be easily employed as the prototype or object picture still with such screen, to make prints on lenticular film or prints otherwise associated or associable with a lenticular screen (for instance, in the latter case the print may be made by exposure on plain film through a separable grating screen, the exposed, separated film being thereafter embossed with corresponding lenticulations, before it is developed). The described grating screen affords the same kind of resolution of aspect elements as the lenticular structure, and it makes no difference to the receiving screen and sensitized surface of Fig. 16, for example, whether the successively projected aspect elements were resolved by an opaque band grating of the improved type shown in Fig. 34 or by a lenticular screen of the sort described hereinabove. In using a negative made with the film of Fig. 34, as the object picture in a projection printer as illustrated in Fig. 17, the negative should be disposed with the screen side facing the movable lamp, and the emulsion side toward the mirror 453.

The opaque bands or other opaque surface of screens such as shown in Figs. 34 to 36 may be applied in any suitable manner, for example by printing with appropriately black or other opaque ink (although white or light colored inks may have some advantage where such a grating is used in a final print or printed picture), and the actual printing operation on the film, i. e. to apply the grating in such manner, may be readily achieved with a rotary or like printing press, from a plate exactly corresponding to the desired screen design. In general for distinctly superior focusing, clarity and definition, the thickness of the ink or other coating of which the opaque bands 703 or the like are made, should not be greater than about $1/20$ of the thickness ($y$) of the film base.

As already indicated, the procedures of the invention afford remarkably improved results in the making of stereoscopic pictures, providing efficient methods and apparatus for carrying out the various steps requisite to completion of any type or stage of operation. Among others, two apparently new and immediately practical results of paramount importance are that truly stereoscopic, positive prints, either of the original or of an enlarged character, can be readily made from pseudoscopic negatives, and that by convenient printing press operations, imprinted reproductions or stereoscopic pictures can be rapidly and economically manufactured in large quantities.

Another arrangement and method suitable in some instances for photographically copying a composite stereograph or part of it, and particularly for making a truly stereoscopic print from a pseudoscopic object or vice versa, comprises projecting light from such an object through its associated screen, and through two large lenses in succession to a sensitized receiving surface faced with a suitable resolving screen, each of the object and receiving surfaces being disposed at the principal focus of the lens nearest it. The object picture is suitably illuminated, e. g. if it is a negative film or other transparency, by light behind it, suitably diffused for uniform incidence all over the rear, emulsion surface. In this manner the first lens produces a virtual image at infinity, and the rays thus apparently proceeding from an infinite distance to the second lens are converged by the latter to a sharp image at the plane of its principal focus.

More specifically, all the rays from any selected image component of the object picture (which has its screen facing the lens system) emerge parallel to each other from the other side of the first lens, having the direction of a line from the selected component through the center of the lens; and the rays from each other component are likewise brought to parallelism by the lens, the several sets of parallel rays thus emerging in corresponding different directions. Although the various sets of rays in a sense diverge from the first lens, the arrangement or nature of the second lens is such—e. g. close to the first or even abutting it, or having a sufficiently larger diameter if spaced away—that at least a usefully considerable proportion of them are received by the second lens just as if they were converging from an infinite source. Relative to the receiving surface the second lens is focused at infinity; each set of parallel rays entering the second lens is thus converged at least almost entirely to a single locality or resolving element of the screen, and there resolved into the original aspect elements, but in a reverse order relative to the order of the image components, while the entire composite image is itself reversed, as in projection with a single lens, relative to the object.

It will be appreciated that in order to take as much advantage as possible of all the aspects in the negative or other object and thus to record them to the maximum possible extent in the sensitive receiving emulsion, but without overlap in the latter, the focal ratios of the focusing elements of the object and receiving screens (e. g. of the lenticular ridges) and the actual focal ratios (the ratio of principal focal length to effective lens width) of the two lenses should all be at least approximately the same. This relationship is achieved in a satisfactory manner, for example, where the first lens is simply that of the camera with which the pseudoscopic negative (now constituting the object) was originally taken, and the second lens is another of identical size and focal length to the first, the actual horizontal opening of each lens being adjusted by its diaphragm to maintain the proper value of $I_c/A_c$ where $I_c$ equals the principal or true focal length of the lens.

For many purposes best results, in avoiding unwanted effects or losses, are had by operating this double lens procedure at a one-to-one overall ratio, with identical lenses very closely facing each other; where the lenses are of a camera type designed for projection in a given direction, their outer faces should be juxtaposed as if the optical system consisted of two cameras looking directly into each other. The screen of the negative is preferably, and that of the receiving film is advantageously, of the transparent, lenticular-ridge type, with the illumination maintained at sufficiently strong intensity behind the object, or otherwise so controlled, as to provide no appreciable image of the surface of the transmitting screen itself at the receiving surface. The screen ridges of the films at opposite ends of the optical system both face the lens system and should be exactly parallel; while for best results in most cases, e. g. for uniformity of photographic exposure, the light traversing the lenses may be restricted to a transverse band or slot-like region such as defined by the lines 70, 71 of Fig. 1, i. e. a horizontal band when the screen ridges are vertical. Each lens, for instance, may have a suitable diaphragm for such purpose.

Accordingly, the procedure just described affords another effective way of making a stereoscopic print from a pseudoscopic negative, at least to reproduce a substantial, central portion of the latter, and at a magnification essentially one-to-one; and the system avoids objectionable features, including a substantial loss of aspects, ordinarily occasioned by attempting to use the large camera lens alone for anything like one-to-one projection.

It is to be understood that the invention is not limited to the specific embodiments herein shown and described but may be carried out in other ways without departure from its spirit as defined by the following claims.

I claim:

1. A method of making, from a composite stereograph divided into picture components each subdivided into aspect elements, a photographic print having a relief effect reverse to that of the stereograph, comprising successively illuminating the aspect elements of the stereograph in an order reverse to the order of picture components and exposing a sensitized surface to the illuminated stereograph with the picture components in a predetermined order and the aspect elements thereof in reversed order, by directing, upon said surface, images of the successively illuminated aspect elements in corresponding succession and in the aforesaid reverse order of disposition of said elements within each component.

2. A method of making a photographic print from a composite stereograph divided into elongated parallel components each subdivided into parallel, linear, aspect elements, comprising scanning the stereograph through a component-resolving, focusing screen, with a light source, for illuminating successive aspect elements, and simultaneously and synchronously scanning the stereograph with a projecting system including a sensitized surface exposed through an adjacent component-resolving, focusing screen for projecting images of the successive aspect elements on said surface, while maintaining between the light source and the first-mentioned focusing screen, and close to the latter, a multiple condensing screen which comprises a transparent sheet with a multiplicity of lenticulations on both sides, and thereby focusing rays from the light source within said condensing screen and re-projecting said rays in collimated array in substantially their original directions, to the first-mentioned focusing screen, each of the first and second mentioned focusing screens comprising parallel, linear component-resolving elements.

3. A method of making a photographic print from a composite stereograph divided into components each subdivided into aspect elements, comprising scanning the stereograph through an adjacent component-resolving, focusing screen, with a light source, for illuminating successive aspect elements, while intermittently obscuring said light source so that said stereograph is scanned with successive brief periods of illumination separated by intervals, of at least equal duration, of non-illumination, and simultaneously and synchronously with said first-mentioned step, scanning the stereograph with a projection system including a sensitized surface exposed through a component-resolving, focusing screen, for projecting images of the successive aspect elements on said surface.

4. A method as described in claim 3 wherein said scanning operations comprise effecting relative movement between said stereograph and said light source and projection system wherein the light source and projection system move relative to each other in opposite directions to effect, in the projection upon said sensitive surface, a reversal of the order of aspect elements within each component, relative to the order thereof in the stereograph.

5. A method as described in claim 3 wherein said scanning steps comprise effecting relative movement between the stereograph and the light source and projection system wherein the said relative motion of the light source and projection system is in the same direction relative to each other to maintain in the projected image on the sensitized surface the same order of aspect elements within each component as occurs in the said stereograph.

6. A method of making a photographic print from a composite stereograph divided into components each subdivided into aspect elements, comprising scanning the stereograph by directing light to it at successively differing angles, while dividing said light, just before it reaches said stereograph, into portions corresponding to said components and while focusing each light portion, as the light direction changes, on successive aspect elements which successively correspond to the angles of light direction, for thereby illuminating successive aspect elements, and simultaneously and synchronously scanning the stereograph by projecting upon a sensitized surface an assembly of light rays from the illuminated aspect elements to form a complete image of the elements that are illuminated at each instant, while successively changing the direction of said projection to correspond with the successive changes of angle of light direction to the stereograph and while dividing said projected assembly of rays just before said assembly reaches said surface, into portions corresponding to stereographic components for the print to be made on the surface, and while focusing each last-mentioned portion, as the projection direction changes, on said surface at successive positions within a stereographic component space, said positions successively corresponding to the directions of projection, for thereby producing a print of said stereograph on said surface, while optically reversing the assembly of rays projected to form the complete image of said stereograph, intermediate the stereograph and said sensitized surface, by optically reversing the order of the successively scanned elements relative to their position in the complete image constituted by them.

7. The method of claim 6 wherein said reversing step comprises turning the light rays from the illuminated aspect elements by reflection as they travel past a predetermined region in the path of projection, and thereby reflecting the assembly of said rays at said region at each instant of the course of said scanning by projection.

8. A method of making a photographic print from a composite stereograph divided into parallel, elongated components each subdivided into parallel linear aspect elements, comprising scanning the stereograph through a screen having correspondingly parallel component-resolving, focusing portions, with an intermittently exposed light source, for illuminating successive aspect elements, and simultaneously and synchronously scanning the stereograph with a projection system including a sensitized surface exposed through a screen having component-resolving, focusing portions disposed parallel to said portions of the first mentioned screen, for projecting successive aspect elements on said surface, while optically reversing the complete image of said stereograph on said sensitized surface by reflectively changing the direction of rays of light from said stereograph to said surface, through a substantial angle, said scanning operations comprising effecting relative movement between the stereograph and the light source and projection system wherein the light source and projection system move relative to each other in a direction for reversing, upon said sensitized surface, the order of aspect elements within each component, relative to the order of said elements in each component of the stereograph.

9. Projection printing apparatus comprising, in combination, means for holding an object picture, a light source movably disposed to illuminate said object picture from a plurality of different angles, a projecting system comprising a lens and means for holding a sensitized receiving surface, said projection system being disposed to project an image of the object picture on said surface, and said lens and surface holding means being each movable for effecting said projection with rays emanating from said object picture at a plurality of different angles, and means for synchronously and simultaneously moving said light source, lens and surface holding means for successive illumination and projection at successively changing angles as aforesaid, said last mentioned means including means maintaining said lens and surface holding means in projecting relationship to the object picture throughout said movement thereof.

10. Projection printing apparatus comprising, in combination, means for holding a transparent object picture in a horizontal position, a projection system comprising a vertically movable lens and vertically movable means for holding a sensitized surface, a mirror disposed to receive rays of light from said object picture and reflect them in a horizontal direction, and said projection system being disposed to receive said rays of light from the mirror for projection of an image of the object picture on a surface held by the surface holding means, a vertically movable light source, a mirror disposed to receive light horizontally from said source and reflect the same in a vertical direction to illuminate said object picture, means for moving said lens and surface holding means through parallel vertical paths, said means including means maintaining said lens and surface holding means in projecting relationship to the object picture throughout said paths, and means timed with the first-mentioned moving means for displacing the light source through a vertical path to effect illumination of the object picture with rays at successive angles thereto.

11. The apparatus described in claim 10 wherein the last mentioned means includes means coupling the same to said means for moving the lens and surface holding means to effect vertical displacement of the light source in a direction opposite to the displacement of the lens and surface holding means, while maintaining a predetermined proportionality of position between said light source and said projection system.

12. Projection printing apparatus comprising, in combination, means for holding an object picture, a projection system including a focusing element and means for holding a sensitized receiving surface, said projection system being disposed to project an image of said object picture on the receiving surface, means for moving said focusing element through a predetermined path transversely of the path of light rays from the object picture to the receiving surface, and means timed with the last mentioned means for moving the surface holding means through a corresponding predetermined path, one of said moving means including adjusting means controlled by the other for maintaining a predetermined optical alignment of said focusing element and surface holding means throughout the displacement of said element and surface holding means, to project on said surface successive images respectively composed of light rays emanating from the object picture at successively different angles, the moving means for the focusing element comprising a member mounted for reciprocation along a linear path, the apparatus including an arm mounted to rock about a predetermined axis and pivotally connected to the reciprocable member, the moving means for the surface holding means comprising a second member reciprocable along a linear path, pivotally connected to said arm for displacement thereby, said adjusting means comprising slotted connections intermediate the reciprocable members and the arm, and said reciprocable members being spaced in a desired optical relationship.

13. Projection printing apparatus comprising, in combination, a pair of spaced sheet-holding means, a focusing element disposed intermediate said sheet-holding means for focusing an image of one sheet upon the other, and means for moving said focusing element and one of said sheet-holding means transversely of the path of light rays in such projection, to effect such projection with light rays emanating from the projected sheet at successively different angles, said last mentioned means including means guiding the moved focusing element and sheet-holding means to maintain the predetermined optical relationship thereof to the other sheet-holding means throughout the movement thereof.

14. Projection printing apparatus comprising, in combination, an illuminating and projecting system including means for holding an object picture, means for holding a sensitized receiving surface, means for focusing an image of said object picture on said receiving surface and means for illuminating the object picture, at least a plurality of said four means being movable, and means for moving said plurality of means relative to the other means along paths transverse of the optical path of light rays from the illuminating means to the receiving surface in the projection system, to project on said receiving surface images composed of light rays emanating from the object picture at successively different angles, said moving means including means effecting corresponding relative movement intermediate the illuminating means and the object picture holding means whereby the object picture is illuminated with light rays incident thereon at successively different angles as the projection of the image changes in angular relation as aforesaid.

15. Projection printing apparatus as described in claim 14 wherein the last mentioned means includes reversing means selectively settable to effect relative movement of the illuminating means and the object picture holding means in either of two opposite directions, relative to the movement of other means to vary the angle of projected rays.

16. Projection printing apparatus as described in claim 14 which includes means timed with said last mentioned means for controlling the illuminating means to interrupt illumination of the object picture intermittently, whereby the latter is illuminated only at successive intermittent periods while the angular relation of illumination and projection are changed as aforesaid.

17. Projection printing apparatus comprising, in combination, means for holding an object picture, a lens, means for holding a receiving surface, said lens and surface holding means being disposed for projection of an image of the object picture on the receiving surface, a drive member associated with said lens and having means mounting the member to move linearly across the path of said projection, a drive member associated with the surface receiving means and having means mounting it for movement linearly across said projection path, guide means extending along said optical path of projection, both said mounting means being adjustably secured to said guide means, for adjustment of the optical distances intermediate the object picture holding means, the lens and the surface holding means, an arm pivotally supported on an axis which is positioned, relative to the object picture holding means, in alignment with the effective optical plane of the object picture in the path of said projection, means pivotally connecting both said movable members to said arm for linear displacement of both said members and of the lens and surface holding means associated therewith, in accordance with angular movement of the arm about its pivot axis, and driving means for swinging the arm through a predetermined angular distance.

18. Projection printing apparatus as described in claim 17 which comprises illuminating means for the picture holding means, including a light source directing rays to the subject picture at a predetermined angular relation, means mounting said light source for linear displacement transversely of the path of said rays changing their angular relation to the subject picture, and means operated by said driving means in timed relation with the displacement of said arm, for moving the light source through a predetermined range.

19. Projection printing apparatus as described in claim 17, which includes a light source having associated means directing light to the picture holding means at a predetermined angular relation, said light source having associated supporting means including a threaded shaft, for moving the light source along a predetermined path transversely of the course of light rays therefrom to change the angular relationship of illumination of the subject picture, and means connecting said driving means and said shaft to turn the latter for the aforesaid displacement of the light source in timed relation with the angular displacement of the aforesaid arm.

20. Projection printing apparatus as described in claim 19, wherein the last mentioned connecting means comprises reversing means selectively settable to effect displacement of the light source in either of two opposite directions relative to the direction in which the aforesaid members are moved by the driving means.

21. Projection printing apparatus comprising in combination, means for holding an object picture in a horizontal position, a lens, a member supporting the lens for passage of light horizontally therethrough, a frame for holding a sensitized receiving surface, said frame having a supporting member therefor to hold said frame with the receiving surface in a vertical plane facing the lens, guide members respectively associated with the first and second mentioned supporting members, to permit sliding movement of each in a vertical direction, horizontal guiding structure to which said guide members are adjustably secured in spaced relation, threaded shaft means for adjusting said guide members along the guide structure to change the optical relations of said lens and frame relative to each other and to the object picture, a mirror mounted to reflect light rays from the object picture toward the opposite side of the lens from the frame, whereby an image of the object picture may be projected on the receiving surface by the lens, an arm, means pivoting said arm on an axis which is disposed, relative to the object picture, in alignment with the vertical plane in which said picture appears as a virtual object in the aforesaid projection, and means pivotally connecting both said supporting members to the arm, said pivotal connecting means including means slidable along the arm, whereby upon angular displacement of the arm about its pivot axis the lens and frame are displaced in a vertical direction, each in an optical plane determined by the adjustment of the guide members on the guide structure, and means for swinging the arm through a predetermined angular distance.

22. Projection printing apparatus as described in claim 21, which includes a lens supporting structure, whereby the lens is carried on its supporting member, and which includes adjustable diaphragm means mounted in said supporting structure for the lens, said diaphragm means comprising a pair of spaced screens having opposed horizontal edges in the path of light through the course of projection, said screens being vertically movable to adjust the vertical distance between their opposed edges, and means for adjusting the mutual position of the screens.

23. Projection printing apparatus as described in claim 21, which includes a light source extending substantially linearly in a horizontal direction transverse of the optical axis direction of the projection path, said light source including means projecting a divergent beam of light therefrom in a horizontal direction, a mirror disposed beneath the picture holding means for reflecting rays from the light source to the object picture for illumination of the latter on the opposite side thereof from the side exposed to projection, means including a threaded shaft for mounting the light source to move in a vertical direction for illumination of the object picture with rays at successively different angles, and means operated by the driving means in timed relation with the displacement of the arm, for turning said shaft to move the light source along its vertical path.

DOUGLAS F. WINNEK.

REFERENCES CITED

The following references are of record in the file of this patent:

UNITED STATES PATENTS

| Number | Name | Date |
|---|---|---|
| 1,444,779 | Clark | Feb. 13, 1923 |
| 1,819,793 | Ross | Aug. 18, 1931 |
| 1,843,595 | Berttion | Feb. 2, 1932 |
| 1,905,469 | Ives | Apr. 25, 1933 |
| 1,984,471 | Fischer | Dec. 18, 1934 |
| 1,997,325 | Tuttle | Apr. 9, 1935 |
| 2,054,313 | Bright | Sept. 15, 1936 |
| 2,057,051 | Owens | Oct. 13, 1936 |
| 2,063,985 | Coffey | Dec. 15, 1936 |
| 2,095,826 | Miller | Oct. 12, 1937 |
| 2,133,121 | Stearns | Oct. 11, 1938 |
| 2,144,649 | Eggert | Jan. 24, 1939 |
| 2,175,114 | Friedmann | Oct. 3, 1939 |
| 2,188,019 | St. Genies | Jan. 23, 1940 |
| 2,228,807 | Bacher | Jan. 14, 1941 |
| 2,282,337 | Mies | May 12, 1942 |
| 2,333,389 | Ringer | Nov. 2, 1943 |
| 2,361,347 | Brown | Oct. 24, 1944 |
| 2,382,604 | Capstaff | Aug. 14, 1945 |
| 2,390,618 | Roehm | Dec. 11, 1945 |